(12) United States Patent
Song et al.

(10) Patent No.: US 10,911,471 B1
(45) Date of Patent: Feb. 2, 2021

(54) SYSTEMS AND METHODS FOR NETWORK-BASED INTRUSION DETECTION

(71) Applicants: Chongya Song, Miami, FL (US); Alexander Pons, Miami, FL (US)

(72) Inventors: Chongya Song, Miami, FL (US); Alexander Pons, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/698,103

(22) Filed: Nov. 27, 2019

(51) Int. Cl.
*H04L 29/06* (2006.01)
*G06N 20/00* (2019.01)
*G06N 7/00* (2006.01)

(52) U.S. Cl.
CPC ......... *H04L 63/1416* (2013.01); *G06N 7/005* (2013.01); *G06N 20/00* (2019.01); *H04L 63/1425* (2013.01)

(58) Field of Classification Search
CPC . H04L 63/1416; H04L 63/1425; G06N 7/005; G06N 20/00
See application file for complete search history.

(56) References Cited

U.S. PATENT DOCUMENTS

| | | | |
|---|---|---|---|
| 8,611,219 B2* | 12/2013 | Golic | H04L 43/022 370/235 |
| 2005/0251860 A1* | 11/2005 | Saurabh | H04L 63/1416 726/23 |
| 2012/0278890 A1* | 11/2012 | Maatta | H04L 63/1425 726/23 |
| 2013/0110761 A1* | 5/2013 | Viswanathan | G06N 20/00 706/52 |
| 2020/0176082 A1* | 6/2020 | Massingham | G06N 3/084 |

OTHER PUBLICATIONS

Stolfo et al, Modeling System Calls for Intrusion Detection with Dynamic Window Sizes, 2001, IEEE, 11 Pages (Year: 2001).*
Himmelmann, Package 'HMM', Feb. 19, 2015, 14 Total Pages (Year: 2015).*

* cited by examiner

*Primary Examiner* — Christopher C Harris
(74) *Attorney, Agent, or Firm* — Saliwanchik, Lloyd & Eisenschenk

(57) ABSTRACT

Systems and methods for network-based intrusion detection are provided. An anti-adversarial Hidden Markov Model can be used to effectively detect evasion patterns for network-based intrusion detection, using dynamic window and threshold techniques to achieve adaptive, anti-adversarial, and online learning abilities. The concepts of pattern entropy, pattern entropy reduction, window width, local optimal window width, and dynamic window can be used in the model.

20 Claims, 9 Drawing Sheets

SYSTEMS AND METHODS FOR NETWORK-BASED INTRUSION DETECTION

BACKGROUND

In the practical deployment of a Network Intrusion Detection System (NIDS) in the industry, there is an imbalance phenomenon, where almost all systems being used are signature-based detectors, which scan characteristic byte sequences of the network traffic. This situation is somewhat surprising, especially when considering that Machine Learning (ML) has successfully been implemented in many other areas of computer science, often resulting in large-scale deployments in the commercial world. Examples from these domains include product recommendation systems (such as those used by Amazon and Netflix), optical character recognition systems, natural language translation, and spam detection, which is similar to the NIDS scenario.

One of the important reasons causing this imbalance phenomenon is that ML-based NIDS is working in an adversarial environment, which makes detection tasks challenging due to the presence of adaptive and intelligent adversaries who can carefully manipulate the attacking payload to evade detection. These evasion attacks undermine the underlying assumption of ML—the stationarity (the same distribution) of data for training and testing. As a larger number of novel online services are emerging, the patterns of legitimate behaviors have become diversified, which in turn blur the boundary between normal and anomaly patterns. Consequently, the existing ML-based NIDS cannot attain the required industry-level performance due to the aforementioned reasons.

BRIEF SUMMARY

Embodiments of the subject invention provide novel and advantageous systems and methods for network-based intrusion detection. An anti-adversarial Hidden Markov Model (HMM) (AAHMM) can be used to effectively detect evasion patterns for network-based intrusion detection, using dynamic window and threshold techniques to achieve adaptive, anti-adversarial, and online learning abilities. The concepts of pattern entropy, pattern entropy reduction, window width, local optimal window width, and dynamic window are used in the AAHMM. The pattern entropy reflects the complexity variation of a sequence of network data samples (packets or flows) resulting from factors such as the length of sections and the number of malicious samples (possibly among others). Window width is the number of samples in each section of the set of data or data samples; splitting the entire data set into shorter subsets and then predicting them in order can effectively enhance the detection rate of sample sequences. The window width can be optimized locally to result in relatively high accuracies (e.g., due to lowering the pattern variation) to give local optimal window widths. Dynamic window, which is an important feature of embodiments of the subject invention, smartly searches and sets every window width as the local optimal window width according to the underlying pattern.

In an embodiment, a system for network-based intrusion detection can comprise: a processor; and a machine-readable medium in operable communication with the processor and comprising instructions stored thereon that, when executed by the processor, perform the following steps: receiving a network dataset; utilizing a dynamic window (DW) of the network dataset to divide the network dataset into a plurality of sections by determining a local optimal window width (LOWW) for each section, respectively, of the plurality of sections and to set the window width (WW) of each section to its respective LOWW, the WW being a quantity of samples in a respective section; and utilizing a Hidden Markov Model-based process (an AAHMM) on the plurality of sections with the respective LOWWs to determine whether the network dataset is benign or malicious. The Hidden Markov Model-based process can use a Baum-Welch procedure for updating. The utilizing of the DW to determine a LOWW for each section can comprise minimizing a pattern variation of the plurality of sections. The DW can utilize a first pair of parameters (model difference and difference trend) to increase adaptability of the Hidden Markov Model-based process and a second pair of parameters (threshold and threshold controller) to provide anti-adversarial capabilities to the Hidden Markov Model-based process. The system can further comprise memory in operable communication with the processor and/or the machine-readable medium.

In another embodiment, a method for network-based intrusion detection can comprise: receiving (e.g., by a processor) a network dataset; utilizing (e.g., by the processor), a dynamic window (DW) of the network dataset to divide the network dataset into a plurality of sections by determining a local optimal window width (LOWW) for each section, respectively, of the plurality of sections and to set the window width (WW) of each section to its respective LOWW, the WW being a quantity of samples in a respective section; and utilizing (e.g., by the processor) a Hidden Markov Model-based process on the plurality of sections with the respective LOWWs to determine whether the network dataset is benign or malicious.

DETAILED DESCRIPTION

Figure 1:
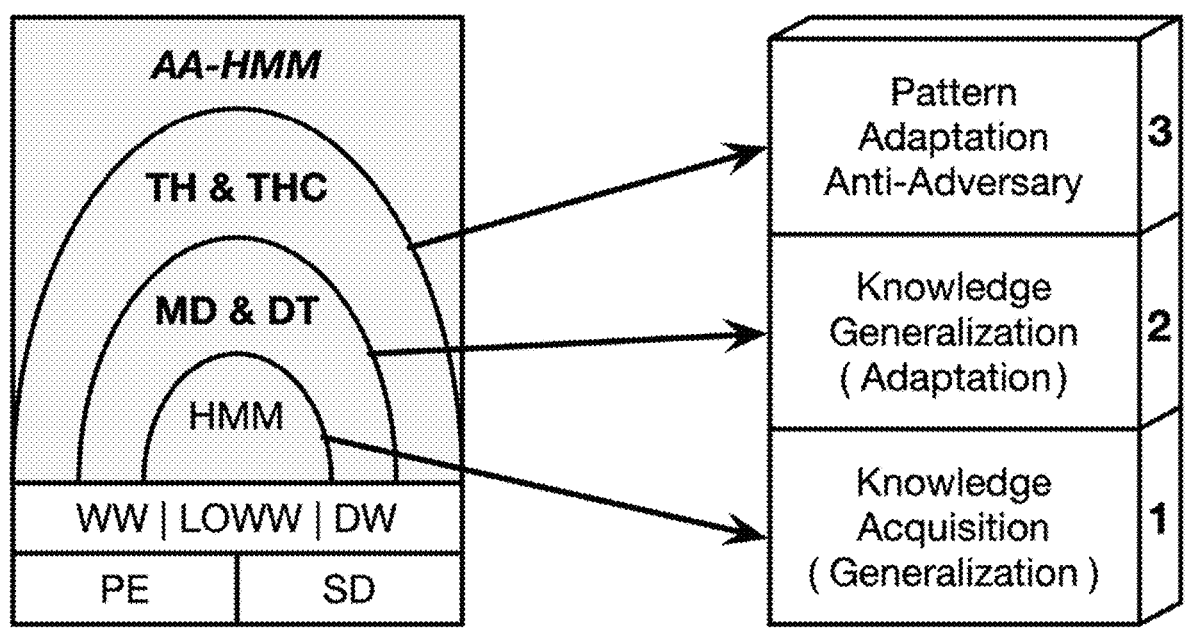
FIG. 1 is a schematic view of an architecture of an anti-adversarial hidden Markov Model (AA-HMM), according to an embodiment of the subject invention.

Embodiments of the subject invention provide novel and advantageous systems and methods for network-based intrusion detection. An anti-adversarial Hidden Markov Model (HMM) (AAHMM) can be used to effectively detect evasion patterns for network-based intrusion detection, using dynamic window and threshold techniques to achieve adaptive, anti-adversarial, and online learning abilities. The concepts of pattern entropy, pattern entropy reduction, window width, local optimal window width, and dynamic window are used in the AAHMM. The pattern entropy reflects the complexity variation of a sequence of network data samples (packets or flows) resulting from factors such as the length of sections and the number of malicious samples (possibly among others). Window width is the number of samples in each section of the set of data or data samples; splitting the entire data set into shorter subsets and then predicting them in order can effectively enhance the detection rate of sample sequences. The window width can be optimized locally to result in relatively high accuracies (e.g., due to lowering the pattern variation) to give local optimal window widths. Dynamic window, which is an important feature of embodiments of the subject invention, smartly searches and sets every window width as the local optimal window width according to the underlying pattern.

The dynamic window can utilize two pairs of variables for adjusting the window width to the local optimal window based on the underlying pattern: (1) model difference and difference trend; and (2) threshold and threshold controller. The first variable pair enables the adaptability of the AA-HMM, whereas the second variable pair provides the model's anti-adversarial capabilities. Model difference is the quantitative model difference between adjacent windows and the difference trend is the difference between two model differences, reflecting the changing trend of the model's parameters between adjacent windows and acting as a calibrating metric for the window width adjustment. The threshold represents the range of dynamic window and acts as a switch that is responsible for making the final dynamic window adjustment; the dynamic window is bounded by the lower and upper bounds of threshold. The threshold controller counts the number of times the threshold bounds are broken by the dynamic window, and makes it more difficult for the dynamic window to break the bounds of the threshold.

ML algorithms currently being considered and created for NIDS can be classified into four categories: (1) ensemble-based; (2) clustering-based; (3) deep-learning; and (4) hybrid. Each one has its disadvantages. The performance of ensemble-based classifiers is highly unpredictable on unseen samples due to the high and non-eliminable correlations among the base classifiers. Because clustering-based models are unsupervised classifiers, their performance is not reliable as they classify samples without learning knowledge from the true labels. In many cases, a clustering algorithm is used as a component of a newly-proposed classifier instead of being used as an individual classifier, such as in cases where a new model is created by combining the advantages of clustering and ensemble algorithms. In practice, a model that solely relies on the ensemble or clustering technique is not the best choice for NIDS because deploying such a model would have a higher possibility of causing unexpected and serious damage to an organization due to its highly erratic generalization abilities on future packets. In addition, although deep-learning classifiers outperform the ensemble-based and clustering-based in terms of detection rate and stability, deploying a deep-learning model in practice can largely reduce network throughput because it usually suffers from the issue of high latency. The efficiency problem could theoretically be alleviated some by quantum computers in the future, but deep-learning is not the best choice for NIDS in terms of efficiency based on the current circumstances. Many enhanced models are classified as hybrid-type, which perform better by either combining the existing approaches in other domains (e.g., fuzzy logic) or creating novel mechanisms (e.g., feedback variables) specifically for NIDS (i.e., AA-HMM according to embodiments of the subject invention), based on a specific shallow algorithm (e.g., decision tree). One possible temporary disadvantage of hybrid classifiers is that they need to be tested on various data sets to verify their stability. However, this long-term evaluation process is necessary for all newly-proposed algorithms. Based on the state of the art, a new hybrid-type algorithm that is accurate and efficient is needed for anomaly-based NIDS in practice.

In view of the disadvantages of existing ML algorithms with respect to practical deployment, it was determined that four requirements are necessary for an applicable NIDS: (1) high detection rate (or low bias) on the trained patterns; (2) online-learning ability for tackling the unseen (including evasion) attacks and patterns; (3) high stability (or low variance) for ensuring the expected performance can be achieved while avoiding the possible severe damage (caused by the erratic performance) in practice; and (4) high efficiency for avoiding the situation where the NIDS is the bottleneck of the network throughput. Consequently, it was determined that a qualified base algorithm for a hybrid algorithm should not be a clustering or deep-learning algorithm, as they violate requirements (1) and (4), respectively. Moreover, in order to enable a common algorithm (e.g., decision tree, support vector machine (SVM), etc.) with online learning ability, an unsupervised learning procedure can be relied on to learn knowledge from the features. Three options are as follows: (1) creating a new unsupervised procedure and combining it with the base algorithm; (2) utilizing an existing unsupervised algorithm (e.g., K-Means) and combining it with the base algorithm; or (3) invoking the unsupervised learning procedure (i.e., Baum-Welch) that comes with the algorithm (i.e., the HMM) in a novel approach. Option (3) is better than options (1) and (2) in terms of performance and reliability because such procedures were specifically designed for the corresponding base classifiers and their performance has been verified.

The Hidden Markov Model (HMM) is one of the algorithms that meets all four of the aforementioned requirements for NIDS. Both theoretical and empirical results have shown that the HMM is capable of representing probability distributions corresponding to complex real-world phenomena in terms of simple and compact models. The HMM is superior due to the strong online learning ability, which is driven by a reliable unsupervised learning procedure called Baum-Welch (BW) (see, e.g., Tan et al., Introduction to Data Mining; Pearson: London, UK, 2006; which is hereby incorporated by reference herein in its entirety). This has been verified by the success of HMM in various practical applications, where it has become the predominant methodology for designing Automatic Speech Recognition (ASR) systems. Likewise, the HMM has been successfully applied to other fields, such as signature verification, communication and control, bioinformatics, computer vision, and network security. HMM-based NIDS can be applied to misuse detection to model a predefined set of attacks and/or in anomaly detection to model normal behavior patterns. Most importantly, HMM-based applications in anomaly and misuse detection have emerged in both the main categories of Intrusion Detection System (IDS): (1) host-based IDS (HIDS); and (2) network-based IDS (NIDS). The HMM has also emerged in applications of Wireless IDS (WIDS). Also, the HMM is the algorithm that requires the least time of adoption for building NIDS. Therefore, the HMM has advantages in terms of performance and its unique qualities.

The performance of HMM can be improved invoking the BW in a novel way, so embodiments of the subject invention can use a feedback mechanism as a metric (represented as a set of variables on the implementation level) to determine the status of the underlying traffic pattern, so that the model can be updated to a local optimal state and have its performance enhanced through invoking the BW based on the pattern status. Six challenges exist for such an implantation, summarized as follows: (1) what are the feedback variables?; (2) why are these feedback variables selected; (3) how can these feedback variables be captured?; (4) how can these feedback variables be measured/quantified?; (5) How can these feedback variables be used?; and (6) how can the BW be invoked based on these feedback variables to improve the performance of the algorithm? These challenges will be addressed below.

Principle concepts that can be used to fully understand the underlying approach of the AA-HMM according to embodiments of the subject invention include: (1) Pattern Entropy (PE); (2) PE Reduction (PERD); (3) Window Width (WW); (4) Local Optimal Window Width (LOWW); and (5) Dynamic Window (DW). Among these concepts, (1) and (2) are the basis of (3) and (4). In addition, (5) is established based on (3) and (4), and acts as the core feedback mechanism that enables the model to adaptively adjust according to dynamic network patterns.

A fundamental concept of algorithms of embodiments of the subject invention is the underlying PE. It is a metric for quantifying the entropy/complexity of a sequence of network data samples (packets or flows). Considering the dynamic and diverse nature of network traffic, an appropriate definition should include the numbers of attacks and attackers, but also consider the sequential and diverse information of samples.

Assuming a labeled intrusion data set, the total number of anomaly and normal samples (packets or flows) are X and Y, respectively; the total number of attackers and legitimate users are A and B, respectively; and the types of anomaly and normal samples are represented as P and Q, respectively. Then, the entropy of this data set or its pattern PE can be defined as:

$$PE(\text{entire data set}) = (AP)^X + (BQ)^Y \qquad (1)$$

Because every anomaly sample might be launched by any attacker, A represents the entropy of every malicious sample in tetras of the possible attackers. Further, every attacker may launch any type of attack, so P represents the entropy of every attacker in terms of the possible attacks. Therefore, the term AP should be interpreted as the total entropy of every malicious sample, and the term $(AP)^X$ is defined as the PE of malicious pattern due to the presence of X malicious samples. After applying the same method to calculate the PE of normal pattern $(BQ)^Y$, the total PE of the entire data set is expressed by adding the two PEs together. It is noted that normalization should not be applied because the PE is intended to reflect the complexity variation resulting from factors such as the length of sections and the number of malicious samples.

Given the definition of PE, if the entropy of a subset was calculated, the value would be much lower than the original or entire samples. For instance, assume a data set with evenly distributed normal and anomaly samples. If only the PE was calculated on any 1/n subset, the variables X, Y, A, B, P, and Q would be reduced to X/n, Y/n, A/n, B/n, P/n, and Q/n, respectively. As a result, the PE of this subset should be calculated as:

$$PE\left(\text{any } \frac{1}{n} \text{subset}\right) = \qquad (2)$$
$$\left[\left(\frac{A}{n}\right)\left(\frac{P}{n}\right)^{\frac{X}{n}} + \left(\left(\frac{B}{n}\right)\left(\frac{Q}{n}\right)\right)^{\frac{Y}{n}}\right] = \sqrt[n]{\frac{(AP)^X}{n^{2X}}} + \sqrt[n]{\frac{(BQ)^Y}{n^{2Y}}}$$

Because the term $(AP)^X$ would considerably decrease after being divided by $n^{2X}$ and rooted by n, the first term in Equation (2) would be much smaller than that in Equation (1). The same comparison is also applicable to the second terms of the two equations. It can then be concluded that, for any data set, the shorter the subset, the lower the PE.

Because an HMM can be employed to predict samples section-by-section (e.g., classifying the first 20 samples, then the next 20 samples, until predicting all the samples), window width (WW) is defined as the number of samples in each section. Inferred from the definition of PE, shorter sections have lower PE and are easier to accurately predict. Therefore, splitting the entire data set into shorter subsets and then predicting them in order would effectively enhance the detection rate of sample sequences.

Figure 2:
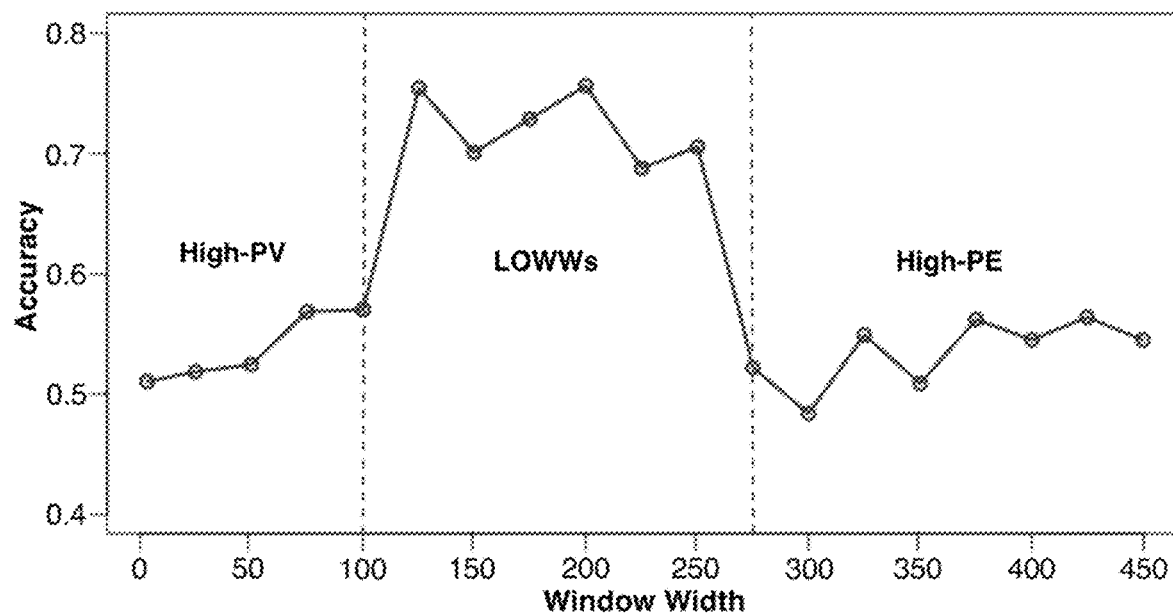
FIG. 2 is a plot of accuracy versus window width.

To determine the correlation between the WW (length of section) and the corresponding accuracy, extensive experiments were performed on a variety of data sets (e.g., NSL-KDD, CTU-13, etc.): (1) building and testing nearly 20 HMMs with the same initial configuration on the same data sets; (2) each model sets up a unique WW—if a model's WW is 25 and a data set has 1000 samples, then this model will split the data set into 40 sections, each one containing 25 samples, and making predictions on the 40 sections (windows) in order; and (3) the range of the tested WWs was 25 to 450 (steps of 25). FIG. 2 provides a representation of the relationship between these models with different WWs and their corresponding accuracies.

For the previous inference regarding the PE, longer WWs usually suffer from higher PEs and are harder to accurately predict, so the models with wide WWs (from 275 to 450) have low accuracies. Although the models with narrow WWs (from 10 to 100) are also inaccurate, this phenomenon does not contradict the inference of PE, but results from another vital factor called Pattern Variation (PV), which is understood as the samples' differences in terms of type and distribution between different windows. Because the HMMs interpret samples as hidden states and observations, the PV should be expressed as the differences between hidden states, as well as the differences between observations, in terms of type and distribution between adjacent windows. Therefore, a higher PV would produce a lower detection rate because it is difficult for a model with a fixed configuration to perform well on all windows (patterns). Consequently, the WWs that result in relatively high accuracies are called Local Optimal Window Widths (LOWWs). As FIG. 2 shows, the LOWWs for this experiment were 125, 150, 175, 200, 225, and 250 samples in length. So, the next task for improving performance was to search for one of the LOWWs and set it as the model's WW.

Figure 3:
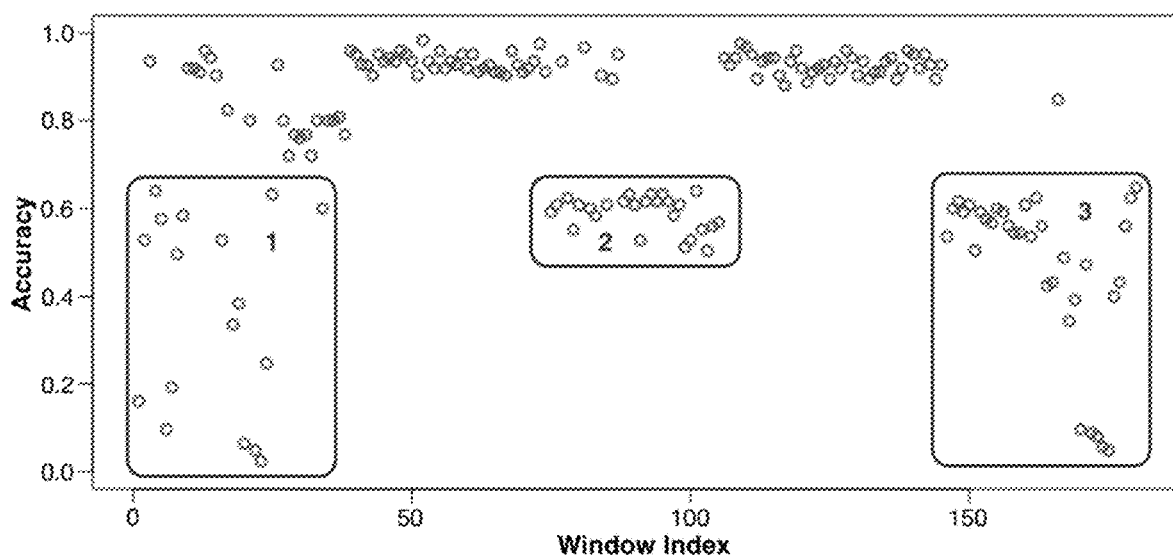
FIG. 3 is a plot of accuracy versus window index, showing correlation between accuracies of dynamic window (DW) with a fixed window width (WW=125) and window indices.

Continuing with the above experiment result and further searching for the best model (WW-125 samples, total number of windows=total number of samples divided by WW=181, overall accuracy=2.885), it was discovered that its performance varies from one window to another, as shown in FIG. 3 (a similar result was found for all models). The windows (dots in clusters 1, 2, and 3) with low accuracies may need to be combined with adjacent windows to faun wider windows or split into multiple windows, so that the patterns of newly created windows are more suitable for the current model's configuration. Further, to maximize the performance the WW should be treated as a variable that is always and continuously subject to change. Therefore, a mechanism called the Dynamic Window (DW), which smartly searches and sets every WW as the LOWW according to the underlying pattern, was designed.

The DW is the key component of the AA-HMM. The DW utilizes two pairs of variables for adjusting the WW to LOWW based on the underlying pattern: (1) Model Difference (MD) and Difference Trend (DT); and (2) Threshold (TH) and Threshold Controller (THC). The first variable pair enables the adaptability of the AA-HMM, whereas the second variable pair provides the model's anti-adversarial capabilities.

FIG. 1 shows a schematic view of the architecture of an AA-HMM according to an embodiment of the subject invention. Referring to FIG. 1, the architecture was constructed upon the five basic variables discussed herein: PE; PV; WW; LOWW; and DW. The detection ability or security level of an anomaly-based NIDS can be divided into three levels (from lowest to highest): (1) strong knowledge acquisition and decent generalization abilities; (2) strong generalization and decent adaptive abilities; and (3) strong adaptive and anti-adversarial abilities. The AA-HMM comprises three layers corresponding to these three security levels:

1. In order to achieve the lowest security level, the regular HMM was adopted as the base algorithm to learn the traffic pattern and make predictions.
2. To attain the second security level, a pair of feedback variables, called Model Difference (MD) and Difference Trend (DT), were designed to improve the adaptability of base HMM.
3. To achieve the top security level, the variable pair called Threshold (TH) and Threshold Controller (THC) were integrated to realize the required anti-adversary ability.

Figure 4:
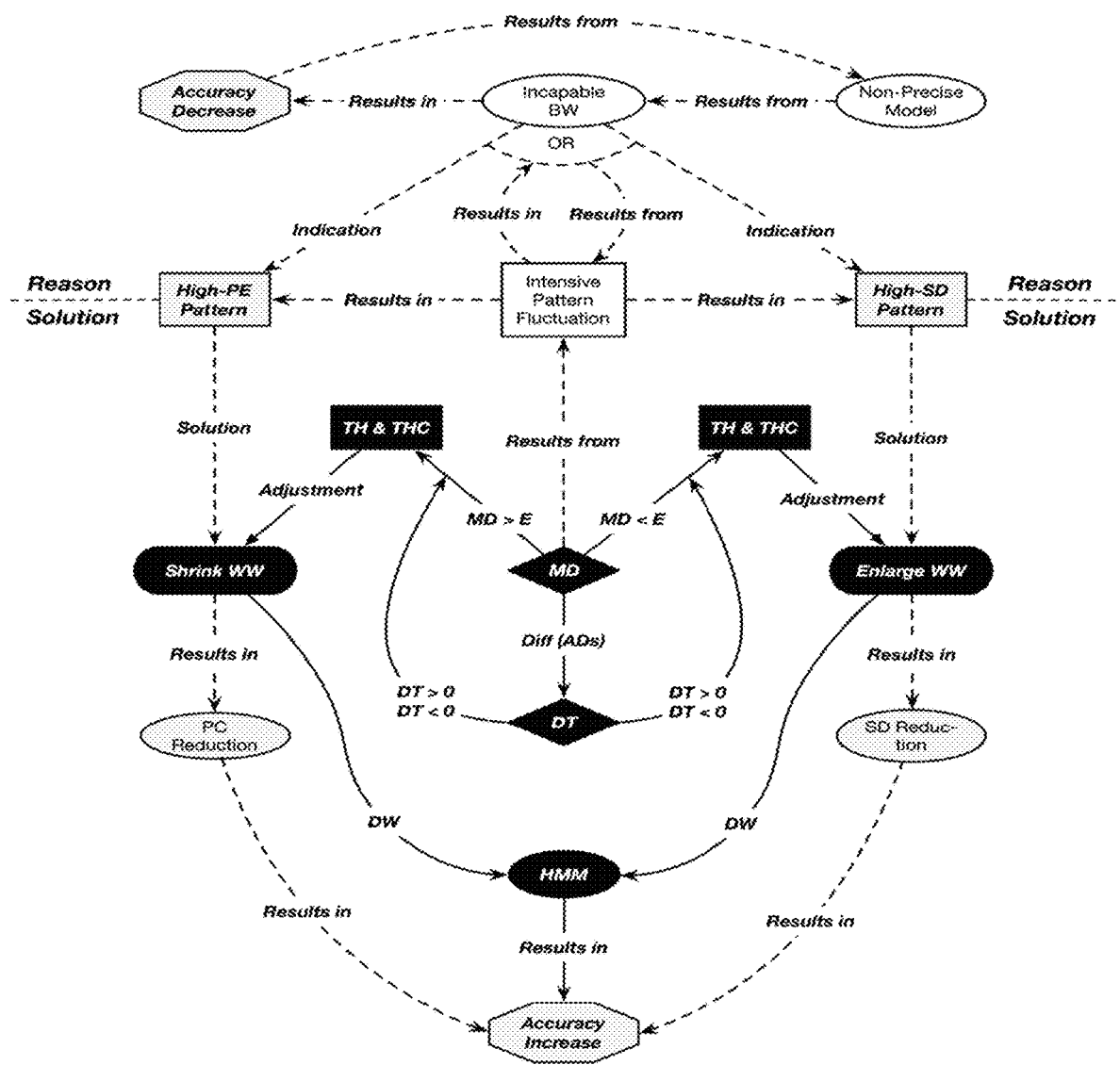
FIG. 4 is a flow chart showing the logic chain of AA-HMM, according to an embodiment of the subject invention. Shapes with a black background are components of AA-HMM; solid lines represent the interactions between components; and dashed lines are relationships between concepts.

FIG. 4 is a flow chart showing the logic chain of AA-HMM, according to an embodiment of the subject invention. Shapes with a black background are components of AA-HMM; solid lines represent the interactions between components; and dashed lines are relationships between concepts. It is important to comprehend the cause of rendering the low detection rate before designing any enhancement mechanism. Referring to the upper part of FIG. 4, if the accuracy decreases, it indicates that the model's parameters are not well tuned to fit the pattern being predicated. Because the BW procedure is responsible for updating the model, the decreased accuracy demonstrates that BW is not capable of updating the transition and emission matrices appropriately, which indicates that the underlying pattern is intensively fluctuating. An intensive fluctuating pattern usually means a stronger randomness of all the samples, which causes two negative factors for a window-based model: (1) high PV where the type and distribution of samples between windows are changing frequently; and (2) high PE where windows include more types of samples as the types of samples are changing frequently. As such, the two negative factors, high PE and PV, can be considered as possible consequences of intensive pattern fluctuation.

Both negative factors are a result of the same phenomenon—an intensive pattern fluctuation that would require the BW to significantly update the model's parameters. Because BW is limited in its ability to update the model to a local optimal state against an intensive fluctuated pattern, the model's accuracy is reduced and can be detected using the feedback variable MD, which is defined as the quantitative model difference between adjacent windows:

$$MD(M_n, M_{n+1}) = \text{Diff}[M_n(W_n), M_{n+1}(W_{n+1})] \quad (3)$$

where $W_x$ is the identity of a window and $M_y$ represents a specific model y. $M_y(W_x)$ is model y's parameters (transition and emission matrices) after updating upon the pattern in window x. Therefore, the entire term $\text{Diff}[M_n(W_n), M_{n+1}(W_{n+1})]$ is the difference between the two models in terms of parameters/configuration, which can be formally defined as, "a vector of differences calculated from consecutive transition and emission matrices in each iteration of the Baum-Welch procedure, which is calculated by summing the $L_2$—Norm distances between consecutive transition and emission matrices" (see also, The R Project for Statistical Computing, at cran/r-project.org accessed on 11 Oct. 2018; which is hereby incorporated by reference herein in its entirety). If the MD is larger than a certain pre-defined value E, it indicates that the predicted pattern is intensively fluctuating and the updated model would not be in a good state, which produces low accuracy. Therefore, in order to improve the accuracy, the PE of the next window needs to be reduced through reducing the WW, so that the BW could update the model in a more accurate state (see FIG. 4). If the MD is smaller than E, the accuracy is being maintained at a high level, indicating that the PE must be at a very low level. In this case, slightly enlarging the WW would not only keep the WW within the range of LOWWs (FIG. 2), but also reduce the PV of the next window, which results in improved accuracy. Further, the amount of WW adjustment is based on the difference in magnitude between the MD and E, where the greater the difference, the greater the adjustment. As such, to consider the tendency factor, the adaptive variable DT is defined as the differences between adjacent MDs:

$$\begin{aligned} DT_n(MD_n, MD_{n+1}) &= \text{Diff}(MD_n, MD_{n+1}) \\ &= \text{Diff}[MD_n(M_n, M_{n+1}), \\ &\quad MD_{n+1}(M_{n+1}, M_{n+2})] \\ &= \text{Diff}\left\{ \begin{array}{l} \text{Diff}[M_n(W_n), M_{n+1}(W_{n+1})] \\ \text{Diff}[M_{n+1}(W_{n+1}), M_{n+2}(W_{n+2})] \end{array} \right\} \end{aligned} \quad (4)$$

As Equation (4) shows, the DT is the difference between two MDs—the difference in the parameter (FIG. 5), which reflects the changing trend of the model's parameters between adjacent windows and acts as a calibrating metric for the WW adjustment. Four sets of operations, derived from the combinations of MD and DT, can be defined:

When MD>E, based on the difference in magnitude between MD and E, the WW should be decreased to reduce the PE, then:

If DT>0, based on the difference in magnitude between the DT and 0, the WW should be decreased again because the DT indicates that the PE of recent windows has continued to increase.

If DT<0, based on the difference in magnitude between the DT and 0, the WW should be increased because the DT indicates that the PE of recent windows has kept decreasing.

When MD<E, based on the difference in magnitude between MD and E, the WW should be increased to reduce the PV, then:

If the DT>0, based on the difference in magnitude between DT and 0, the WW should be increased again because the DT indicates that the PV of recent windows has kept increasing.

If DT<0, based on the difference in magnitude between the DT and 0, the WW should be decreased because the DT indicates that the PV of recent windows has kept decreasing.

Figure 5:
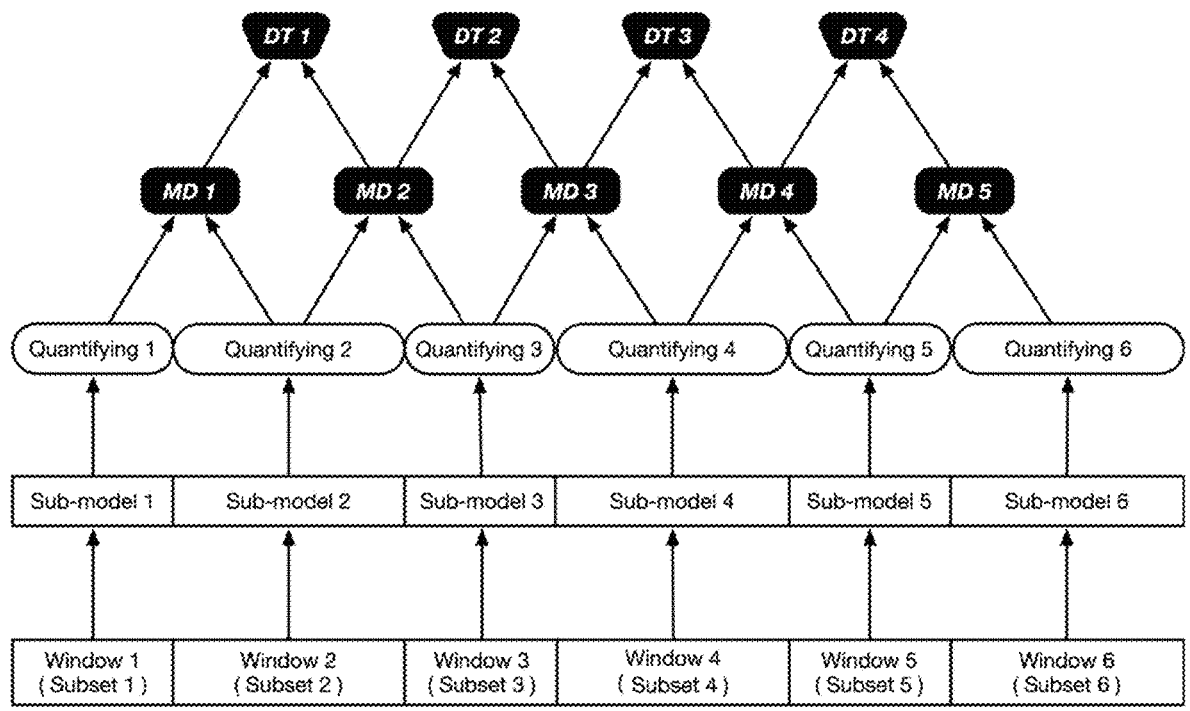
FIG. 5 is a flow chart showing an adaptive mechanism—model difference (MD) and difference trend (DT).

The variables MD and DT are indicators and reveal the underlying pattern information (FIG. 4), which is used with the four operations to adjust the DW and WW based on the patterns, resulting in the ability of the model to correlate with the pattern of the samples. The pattern information is successfully extracted, stored, and utilized by the MD and DT. An overview of the architecture (assuming that there are six windows in total) of the adaptability of the approach is depicted in FIG. 5.

Figure 6:
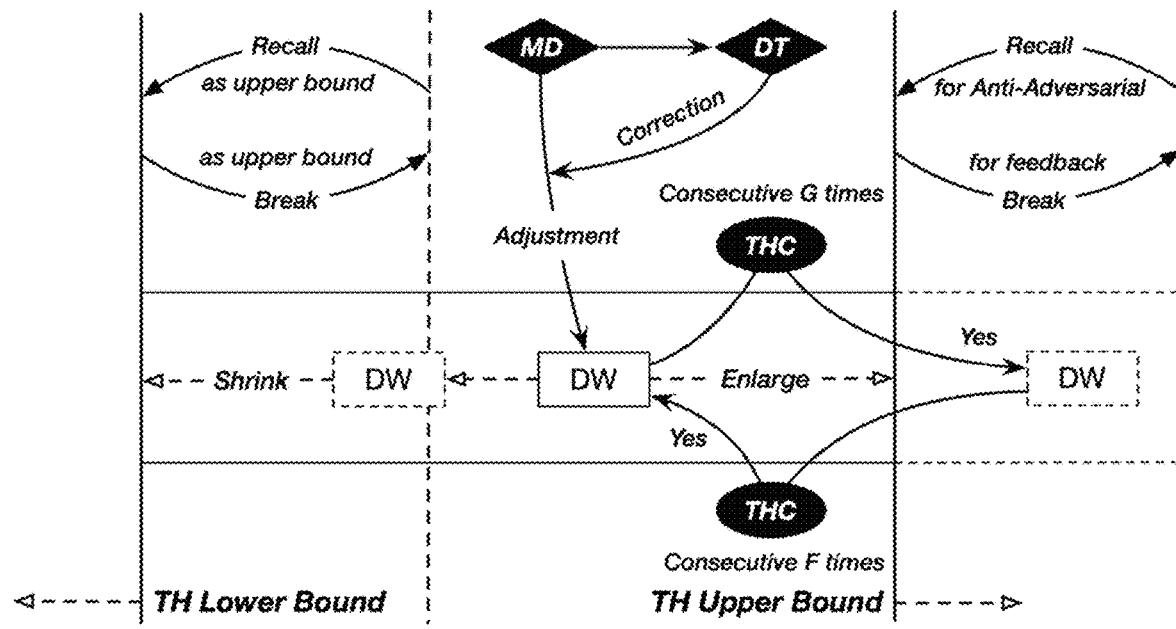
FIG. 6 is a flow chart showing an overview of the logic chain of threshold.

The AA-HMM can resolve three types of evasion attacks. (1) For any kind of evasion technique that is not specific to the ML-based NIDS, selecting a base algorithm with a strong generalization ability is always a sensible decision because the evasion difficulty is improved once adopted. As a probability-based algorithm, the HMM is inherently capable of identifying samples that have never seen before. (2) Optimal Evasion (OE) is one of the most recent types of evasion attacks that specifically targets ML-based NIDS. OE creates malicious samples by minimally manipulating the initial attack until it successfully evades detection. For example, OE may successfully evade detection by only modifying the value of a numeric feature from 10,000 (can be detected) to 10,001 (cannot be detected). Because this malicious sample is extremely close to its initial sample (normal version), an anomaly-based model may misclassify it as normal. To counteract this type of evasion, all the numeric features can be discretized and nominal features can be aggregated into three to five bins, so that any manipulation of a sample would be amplified to a level that could be detected by the model. In addition, this pre-processing approach can improve the HMM's general accuracy against all types of samples. (3) Some sophisticated attackers may evade detection by sending some manipulated samples to the feedback-enabled NIDS, which gradually train the detector to a state that is not capable of identifying any attack launched later. If this type of attack is defended against by disabling the feedback component, the accuracy would be largely decreased due to the misclassifications of all other types of samples (including normal ones). Accordingly, to enable the model to identify the intensions of attackers, a variable called Threshold (TH), which represents the range of DW, can be defined. The logic chain of TH (the relationship between DW and TH) is shown in FIG. 6.

Referring again to FIG. 4, as an anti-adversarial variable, the TH acts as a switch that is responsible for making the final DW adjustment. Referring to FIG. 6, the DW is bounded by the lower and upper bounds of TH. To understand the acceptable range of TH and the safeguards against improper values, if the MD and DT contribute to enlarging the DW to a value that is higher than the current upper bound, the TH would refuse this adjustment request and set the DW to the middle point of the current upper and lower bounds, unless it consecutively receives the same request for F times (a threshold/counter for increasing the upper bound; see Table 1 below). Consequently, for the TH recall procedure, if the MD and DT contribute to reducing the DW to a value that is lower than the current lower bound, the TH would also refuse this adjustment request and set the DW to the middle point of the current upper and lower bounds, unless it consecutively receives the same request for G times (a threshold/counter for recall the increased upper bound; see Table 1 below). There are two reasons for these operations. (1) Because the network pattern is extremely irregular, "spurs" (normal, but temporary pattern fluctuation) can be found anywhere. If the model response is set and the DW is adjusted to any arbitrary value given these spurs, the DW might be enlarged or reduced to either a too large or small a value. The model would suffer from either high PE or PV and the accuracy would considerably decrease. Therefore, the values of F and G can be set as the metrics of TH to ignore these spurs and stabilize the accuracy. (2) Similar to the spur activity, malicious traffic that intends to misleadingly train the NIDS can also be omitted once an appropriate value of F and G are set based on the characteristics of the specific attack.

In addition, if the TH consecutively triggers the request to enlarge the DW for F times due to the normal pattern change (necessary feedback operation), instead of directly adjusting the DW to the intended WW, the DW can be adjusted to the average of the current upper bound plus the average of the sum of the intended WWs during the past F consecutive windows. Correspondingly, the upper bound can be "broken" and increased by the average of the sum of the intended WWs during the past F consecutive windows. The lower bound can be increased by the same step as the upper bound. Similar operations can also be applied to the DW recall procedure. As a result, this series of operations further enhance the model's adaptive abilities toward normal and intensive pattern fluctuations.

Once the attackers successfully mislead the model, the next two things they would do are to stop sending the malicious training traffic and launch the real attacks that cannot be detected by the misled model. Notably, the pattern of malicious training traffic would be different from that of the actual attacks. Most importantly, even if the AA-HMM is misled, it can automatically recover itself to the normal state using the recall operation—the extended sections of upper and lower bounds would be recalled once the malicious training samples have not been consecutively received G times. The values of F and G can be flexibly set based on the defensive strategy and the desired security level.

TABLE 1

Variables of AA-HMM.

| Name | Description | Default Value |
|---|---|---|
| window width | width of the dynamic window | 10 |
| window base line | minimum width of the dynamic window | 10 |
| threshold lower bound | lower bound of the dynamic window | 10 |
| threshold upper bound | upper bound of the dynamic window | 1000 |
| threshold break | a counter that records the number of consecutive requests of increasing the threshold upper bound | garts from 0 |
| F | threshold for increasing the upper bound | 3 |
| threshold recall | a counter that records the number of consecutive times of the increased section of threshold has not been used | starts from 0 |
| G | threshold for recall the increased upper bound | 3 |
| threshold controller | controlling the difficulty of threshold adjustment | 0 |
| MD vector | levels of resizing the window based on the MD | from 1.5 to 0.5 step by −0.1 |
| DT vector_en | he levels of enlarging the window based on the DT | from 1 to 1.2 step by 0.02 |
| DT vector_sh | levels of reducing the window based on the DT | from Ito 0.8 step by −0.02 |
| levels | graininess of WW adjustment for MD and DT | from 0 to 1 step by 0.1 |

Particularly, repeatedly enlarging or reducing the DW is not a wise strategy due to the high PE or PV, even if the MD and DT trigger the DW adjustment because the DW cannot be rapidly decreased or increased to common values once this extremely fluctuated pattern passes. Accordingly, to tackle this kind of extreme case, another feedback variable called Threshold Controller (THC) can be used to control the difficulty of breaking the bounds of TH. THC is responsible for counting the times of breaking bounds (see FIG. 6). The more that breaking operations are accomplished, the more difficult it is to break the current bounds again. For instance, if the model increases the upper bound two times (THC=2), the current upper bound would not be increased again unless the TH consecutively receives F+THC times requests for increasing TH, which is triggered by the DW increasing operation.

In an embodiment, an AA-HMM can be implemented using R Language. Its essential procedures, such as Forward-Backward (FB) and Baum-Welch (BW), can be invoked, for example, from an existing package (e.g., an existing package named HMM (see, e.g., The R Project for Statistical Computing, supra.)). Neither the FB nor BW suffer from the problem of floating-point underflow because the package's implementation avoids it by converting the probability values into logarithms during the calculation and then converting them back at the end. Table 1 presents the all variables and their default values.

5.2. Ensemble

Although many pre-processing algorithms, such as Principal Component Analysis (PCA) and Linear Discriminant Analysis (LDA), effectively reduce the dimensions of a data set, these approaches typically result in information (pattern or knowledge) losses. Therefore, embodiments of the subject invention can achieve the same goal in an opposing manner: (1) keeping as many features as possible; (2) training a sub-model for each feature, separately; and (3) obtaining the final prediction results through ensemble. This approach not only avoids the high-dimensional issue, but also has two extra advantages:

Even if the number of qualified sub-models is not enough for ensemble, multiple dummy sub-models with varied parameters (e.g., the WW) on the same feature can be built. Because the trajectories of different DWs would vary, the prediction results toward the same sample within different windows would be distinctive, which can be used to ensemble the result.

Because the sub-models are working concurrently and considering the time cost of ensemble procedure remains constant, the total time cost is only bounded by the sub-model with the highest time cost: TotalTimeCost(TTC)=Max[$T(M_1)$, $T(M_2)$, ... $T(M_n)$], where the function $T(M_x)$ represents the time cost of each sub-model.

Figure 7:
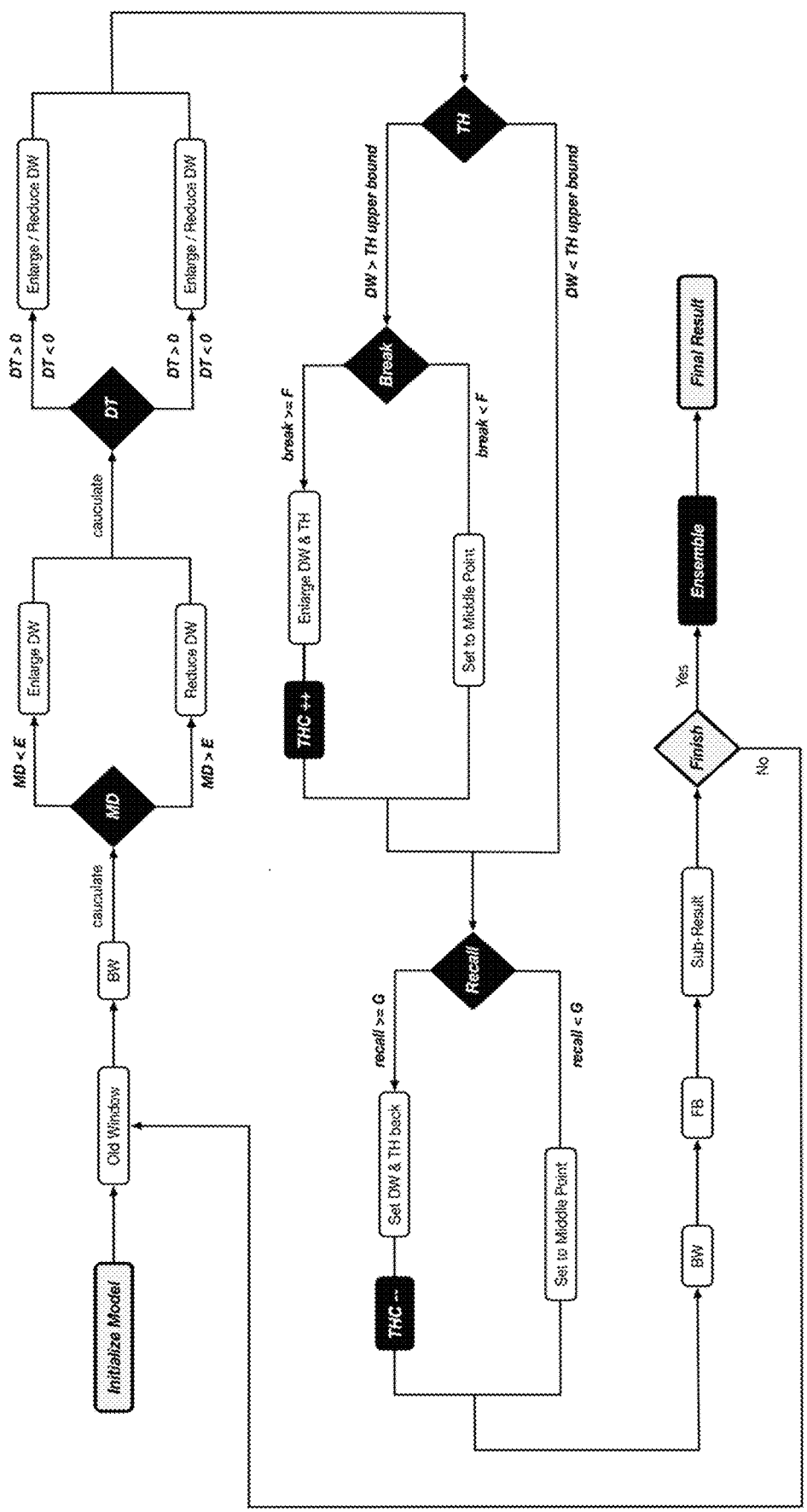
FIG. 7 is a flow chart showing workflow of AA-HMM, according to an embodiment of the subject invention.

FIG. 7 shows an overview of the AA-HMM workflow, according to an embodiment of the subject invention. Referring to FIG. 7, the variables MD, DT, TH, and THC work sequentially, as described herein, to adjust every WW to LOWW based on the underlying pattern. In addition, the BW is only executed two times, leading to improved efficiency.

5.3. Pseudocode
AA-HMM (default setting, minor variables are omitted)

Initial the model
While (until reach the end of the data set)
   DW moves forward by the step of the current WW
   BW updates the model based on the current window
   Quantifying the current model ($M_n$)
   Calculating $MD_m = (M_{n-1}, M_n)$
   Adjusting Window Width based on $AD_m$:
     if MD in (0, 0.1) then
       WW = WW × MD vector [0]
     else if MD in (0.1, 0.2) then
       WW - WW × MD vector [1]
     else if MD in (0.2, 0.3) then
       WW = WW × MD vector [2]
     ....
     else MD in (1, ∞) then
       WW = WW × MD vector [10]
     end if
   Calculating DT = ($MD_{m-1}$, $MD.$,)
Adjusting Window Width based on DT:

5.3. Pseudocode
AA-HMM (default setting, minor variables are omitted)

```
if DT in (0, 0,1) then
    WW = WW × DI vector_en [0]
else if DT in (0.1, 02) then
    WW = WW × DT vector_en [1]
else if DT in (0.2, 0.3) then
    WW = WW × DT vector_en [2]
......
else DT in (1, ∞) then
    WW = WW × DT vector_en [1.0]
end if
if DT in (−0.1, 0) then
    WW = WW × DT vector_rd [0]
else if DT in (−0.2, −0,1) then
    WW = WW × DT vector_ rd [1]
else if DT in (−0.3, 0.2) then
    WW = WW × DT vector_rd [2]
......
    else DT in (−∞, −1) then
        WW = WW × DT vector_ rd [10]
    end if
Adjusting WW & TH:
    if TH break > F + THC then
        new WW = {current upper bound + average [sum (intended WWs in recent F times)]}/2
        new TH upper bound = {current upper bound + average [sum (intended WWs in
        recent F times)]/2}
        new TH lower bound = current lower bound increased section of upper bound
        THC ++
    else then
        new WW = (current lower hound + current upper bound)/2
    end if
    if TH recall > G then
        new WW = {current lower bound − average [sum (intended WWs in recent G
        times)]/2}
        new lower bound = {current lower bound − average [sum (intended WWs in recent G
        times)]}/2
        new upper bound = current upper bound − decreased section of lower bound
        THC −−
    else then
        new WW = (current lower bound + current upper bound)/2
    end if
BW updates the model based on the current window
Quantifying the current model. (M$_{n-1}$)
Calculating MD$_{m-1}$ = (M$_{n-2}$, M$_{n-1}$)
FW predicts the samples in DW → sub-result: x$_n$
End while
Ensemble → majority voting among (x$_1$, x$_2$, . . . x$_n$) → eensemble results χ
```

General accuracy may not reveal NIDS performance in real settings because the cost of misclassifying malicious samples is much higher than misclassifying benign samples. Therefore, the evaluation of NIDS should focus on specific precision and recall for benign and malicious samples, respectively. Although precision best reflects the model's accuracy based on its definition, recall can reveal the real losses caused by unidentified attacks in a practical setting. Other metrics, such as Receiver Operating Characteristic (ROC) curve, are inappropriate for evaluating the NIDS.

Cost matrix is a good metric for evaluating the NIDS because it can directly reflect the security (protection) level established by the models deployed in an operational environment. However, the common values, such as true positive, true negative, false positive, and false negative, have not been published and cannot be calculated given the published metrics. Therefore, referring to the definition of cost matrix, an alternative metric called Efficiency Matrix (EM) is defined as below, which evaluates the security level by calculating the precisions and recalls of benign and malicious samples, separately.

In Table 2, the matrices $E_{11}$, $E_{12}$, $E_{21}$, and $E_{22}$ are the efficiency values of Precision (B), Recall (B), Precision (M), and Recall(M), respectively. The efficiency of the evaluated model can be calculated by:

$$\text{Efficiency(Model)} = \text{Precision}(B) \times E_{11} + \text{Recall}(B) \times E_{12} + \text{Precision}(M) \times E_{21} + \text{Recall}(M) \times E_{22} \quad (5)$$

The EM can be interpreted in a different manner from the cost matrix: the higher the efficiency, the better the performance. The pre-defined value $E_{xy}$ varies between scenarios (applications). For evaluating EM, because misclassifying malicious samples is more costly than benign samples and the recall is a better metric than the precision in terms of reflecting the protection level provided by the model, the four efficiencies should maintain the following relationship:

$$E_{22} > E_{21} > E_{12} > E_{11} \quad (6)$$

TABLE 2

Definition of Efficiency Matrix (EM).

| Efficiency Matrix | Precision | Recall |
| --- | --- | --- |
| Benign | $E_{11}$ | $E_{12}$ |
| Malicious | $E_{21}$ | $E_{22}$ |

Anti-adversarial models of embodiments of the subject invention are very useful in the anomaly-based network intrusion detection field, including the field of software-defined network-based NIDS models. As a successful anti-adversarial prototype, AA-HMM quantifies the model difference (MD) and difference trend (DT) between adjacent windows as indicators of accuracy and pattern fluctuation, which transforms a regular HMM into an online algorithm with strong adaptability. The threshold mechanism (TH and THC) is a core anti-adversarial technique adopted by AA-HMM, which further enhances the adaptability and stability of the model. Particularly, the online architecture of DW, which predicts samples section-by-section, used in AA-HMM can wrap other quantified algorithms to largely improve the performance of the base models. In addition, AA-HMM can be used as a novel visualization tool to indicate if the NIDS is being attacked and to even distinguish the attack type based on the DW trajectory. The results in Examples 1-3 help demonstrate this.

Related art machine learning (ML) models suffer from disadvantages and have not been widely adopted by industry, for at least the following five reasons. (1) The NIDS is working in an adversarial environment, which makes detection tasks challenging due to the presence of adaptive and intelligent adversaries that can carefully manipulate the attacking payload to evade detection. These evasion attacks undermine the underlying assumption of ML—the stationarity (the same distribution) of data for training and testing. (2) As a larger number of novel online services are emerging, the patterns of legitimate behaviors have become diversified, which in turn blur the boundary between normal and anomaly patterns. The accuracy of ML-based NIDS would be compromised in such highly dynamic environment. (3) Although some complex deep-learning models with numerous hidden layers may achieve relative high detection rates on cyber-attacks, their extremely low efficiency has been recognized as an unresolvable issue by both research and industry fields for many years, which is a structural deficiency inherent in all types of neural network. (4) Due to the principle of ML, most of the ML-based models are relying on gaining patterns of attacks from the collected data sets. However, the necessary processes/tasks of data set generation (e.g., recording the traces of attacks, analyzing characteristics of attacks, formatting the raw data as training material, etc.) are difficult, lengthy, and expensive (to perform). This situation means that the experimental accuracies of ML-based models are inclined to overestimate because the captured patterns are only a small subset of all the patterns. (5) Any research result of an ML-based model will not be pursued by the industry unless it has been validated by a set of persuasive evaluations. Because the detection scope and ability of a model will be determined once it was trained, one cannot distinguish if any good performance can be attributed to the model or only results from the similarity between the training and testing sets. Therefore, industry will not recognize the performance of a pre-trained ML-based model even if it achieved high accuracy in the evaluation. AA-HMM of embodiments of the subject invention, on the other hand, can effectively detect evasive attacks (refer to point (1)) and identify the blurred boundary between the normal and anomaly patterns (point (2)) through its strong online learning ability. AA-HMM is one of the most efficient models because it adopts the Hidden Markov Model as the base model, which belongs to the family of "shallow" algorithms (point (3)). Due to the nature of online learning, the AA-HMM is not trained by collected data sets, which means its performance would not subject to overestimating (point (4)). Also, because the AA-HMM is never trained by a certain data set, its performance is not due to any similarity between the training and testing sets, so industry will be more receptive to recognizing its good performance as attributable to the model itself (point (5)).

One of the most widely used signature-based NIDS examples is a light-weight NIDS named "Snort" (see Sommer et al., Outside the Closed World—On Using Machine Learning for Network Intrusion Detection. In Proceedings of the IEEE Symposium on Security and Privacy, Berkeley/Oakland, Calif., USA, 16-19 May 2010). This signature-based NIDS has some disadvantages compared with the AI-driven NIDS. It can only detect the attacks that are covered/recorded by its rule library; namely, it cannot identify any type of zero-day/unknown attack. Also, the signature-based NIDS is not able to detect encrypted malicious traffic (e.g., VPN) because the exposed packets' information is far from enough for it to make classification/detection. In addition, in order to maintain a high detection rate, the signature-based NIDS has to keep track of the newest malicious patterns and update the rule library accordingly. However, the updating work cannot be done in a timely manner, which makes the NIDS exposed to/attacked by the newest attacks all the time. Due to the aforementioned three disadvantages, a signature-based NIDS is usually composed of other components to complement the inherent deficiencies, which may not be accurate and reliable as its rule-based mechanism. In contrast, as an anomaly/ML-based NIDS, AA-HMMs of embodiments of the subject invention have a much stronger generalization ability to detect all types of zero-day attacks and are able to make classifications based on the limited exposed information of encrypted packets. Because the AA-HMM is an online learning algorithm, it maintains high accuracy by real-time self-training instead of learning patterns from collected/analyzed data sets. The AA-HMM can be deployed as a NIDS independently because it does not have fatal disadvantage in terms of the detection scope of attacks.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various readonly-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Example 1

A first experiment was run to test and verify the effectiveness of feedback mechanisms/variables of embodiments of the subject invention. The AA-HMM models being tested adopted the default settings and the initial matrices (transition and emission) were set with balanced parameters for better demonstrations. In the first experiment, NSL-KDD (see Canadian Institute for Cybersecurity, at unb.ca; which is hereby incorporated herein by reference in its entirety) was used as the benchmark data set. NSL-KDD is one of the most frequently used data sets for evaluating the NIDS and has no distinct disadvantage compared with the newest data sets. NSL-KDD is one of the best data sets, if not the best data set, for a comprehensive performance comparison.

In order to conduct a rigorous comparison, algorithms for comparison were selected based on the following criteria: (1) the algorithm has to have results using the two-label version of NSL-KDD instead of the five-label version; (2) the algorithm has to have results that used Test+ (includes all the difficult samples that are not contained in the other test set, test-21) as the test set, because the NSL-KDD is valuable for providing researchers a great test set Test+ with distinct patterns from the training sets, which better reveal the performance difference between the different models; (3) the algorithm has to have results using Test+ as a separate test set, so that it could be ensured that the difficult patterns/samples would not leak to the model during training phase through other evaluation approaches such as cross-validation; and (4) the algorithm had to have enough metrics for a comprehensive comparison. Three deep-learning algorithms were selected: (1) deep neural network (DNN) (see Tang et al., Deep Learning Approach for Network Intrusion Detection in Software Defined Networking. In Proceedings of the International Conference on Wireless Networks and Mobile Communications (WINCOM), Fez, Morocco, 26-29 Oct. 2016; which is hereby incorporated by reference herein in its entirety); (2) soft-max regression (SMR); and (3) self-taught learning (STL) (Niyaz et al., A Deep Learning Approach for Network Intrusion Detection System. In Proceedings of the 9th EAI International Conference on Bio-inspired Information and Communications Technologies, BICT'15, New York, N.Y., USA, 3-5 Dec. 2015; pp. 21-26; which is hereby incorporated by reference herein in its entirety) as the comparison algorithms based on the aforementioned four criteria, which were evaluated on NSL-KDD in terms of accuracy, precision, recall, and efficiency.

Enhanced versions of HMMs typically use some sort of prior knowledge to initialize the transition and emission matrices, which enables the adopted parameters' distribution to comply with the real data distribution to be evaluated. As a result, it could not necessarily be distinguished whether the improvement in performance was due to the skewed initial model or the enhancement mechanisms of embodiments of the subject invention. Accordingly, to eliminate biasing factors, the AA-HMM was initialized as a Balance Model (BM)—the probabilities in the transition and emission matrices were evenly distributed, as shown in Tables 3 and 4. Because the initial model was not biased to either one of the two classes, any accuracy improvement would then be attributable to the actual mechanism of the algorithm of embodiments of the subject invention.

TABLE 3

Initial transition matrix.

| Transition | Benign | Malicious |
|---|---|---|
| Benign | 0.5 | 03 |
| Malicious | 0.5 | 0.5 |

TABLE 4

Initial emission matrix.

| Emission | Observation 1 | Observation 2 | . . . | Observation n |
|---|---|---|---|---|
| Benign | 0.5 | 0.5 | . . . | 0.5 |
| Malicious | 0.5 | 0.5 | . . . | 0.5 |

As the method performance is determined by the transition and emission matrices, every row would become very long if there were too many items (hidden states or observations) in the two matrices. In practice, to maintain a valid model during evaluation, each state or observation would occupy a portion of the total probability of one, even if it is not present in the current window, which in turn complicates distinguishing the true hidden state harder during the FB procedure. Therefore, creating and maintaining a Compact Matrix (CM) would contribute to the model generating higher accurate results.

Figure 8:
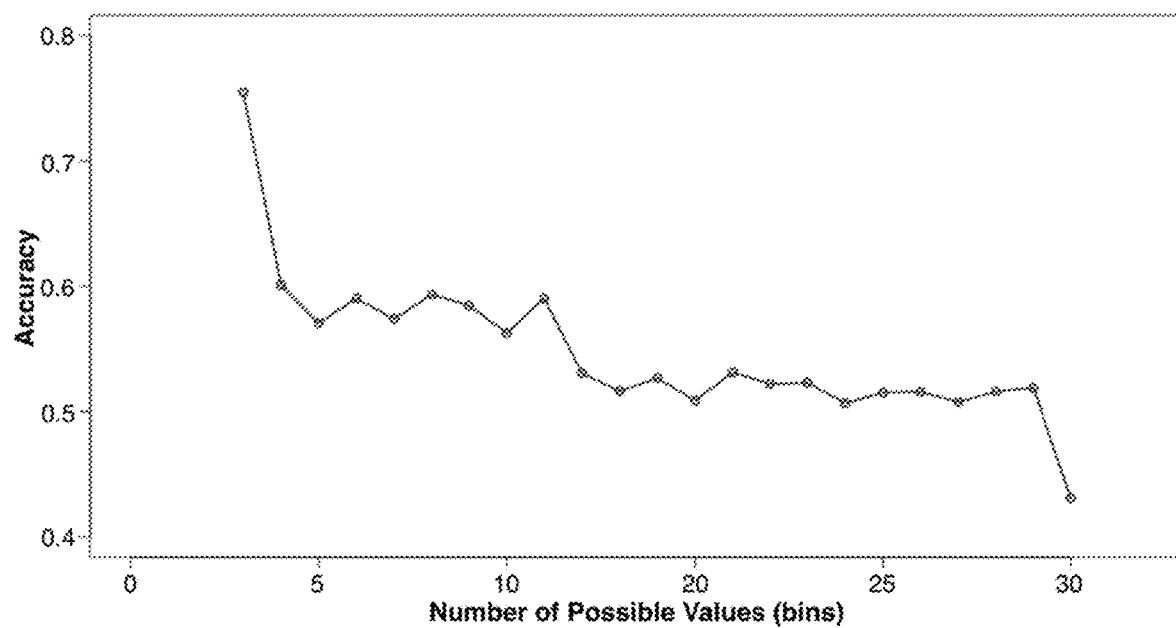
FIG. 8 is a plot of accuracy versus number of possible values (bins).

To verify this conclusion, an extensive experiment was performed on a variety of data sets as shown in FIG. 8. One of the experiments involved discretizing a feature into different bins (from 3 to 30 and step of 1) as the observation sequences. Then, the same AA-HMM (WW=125) was run on each data set. It was concluded that the more bins (possible values) of a feature, the lower the accuracy. Therefore, it was verified that grouping the possible values into a small number of bins (CM) would be one of the best pre-processing approaches for HMM-based algorithms, as similar results were obtained using other data sets, because it not only improves the accuracy, but also thwarts the OE. Consequently, due to the monotone decreasing characteristic of the accuracy trajectory (FIG. 8), a conservative pre-processing strategy was adopted that discretizes all the numeric features into only three to five bins for all the following experiments, even if larger bins (e.g., 6, 6, 8, 9, 10, etc.) are also appropriate (i.e., perform as well as 3-5 bins).

Although a more accurate result can be obtained by only ensemble the models built upon the top N features, the overall performance might be lower or not stable in the future because the top N features would be replaced by others when the pattern changes. Therefore, to build a robust model, the accuracy was improved by assigning additional two to four weights to the top N models.

NSL-KDD is an optimized version of the well-known data set KDD. It solves some of the inherent problems of the original data set and has been frequently cited by researchers. The amount of records in NSL-KDD training and testing sets are reasonable, enabling the affordable completion of experiments on the complete set without the need to randomly select a small portion. Consequently, the evaluation results of different research work would be consistent and comparable. There are 41 features in NSL-KDD data sets and the samples are divided into two classes—benign and malicious. Also, the attacks can be classified into four categories: (1) denial of service; (2) probing; (3) user to root; and (4) remote to local. A detailed introduction can be found in Dhanabal et al. (A Study on NSL-KDD Data set for Intrusion Detection System Based on Classification Algorithms. Int. J. Adv. Res. Comput. Commun. Eng. 2015, 4, 446-452), which is hereby incorporated by reference herein in its entirety.

Thirteen features were eliminated before running the AA-HMM because all the samples were concentrated on a single possible value of those features either before or after discretization, which should be treated as uninformative features. As a result, 28 of 41 features were adopted by the AA-HMM and only one sub was assigned a greater weight during the ensemble procedure.

Tables 5-8 depict the performance of DNN, SMR, STL, and AA-HMM, respectively (the latter is an embodiment of the subject invention). Four points can be gained from the results, as follows, noting that "B" refers to benign, and "M" refers to malicious. (1) AA-HMM outperformed the DNN on all metrics. (2) SMR is not a balanced model as its performance concentrates more on metrics precision (B) and recall (M). Also, because the SMR's precision (M) is very low, it achieves high recall (M) by predicting as many malicious records as possible. Deploying an SMR model in a real setting would delay the service (e.g., web service) response time, as it would block too many legitimate packets due to low recall (B), which causes the blocked data to be re-transmitted to the end users. A balanced model should control the differences in the four metrics within 10%, like AA-HMM (only 2.225%). (3) Although STL is better than the DNN and SMR, its precision (B) and recall (M) were much lower than that of AA-HMM. Also, the metric recall (M) shows that the STL is not a reliable NIDS because it would miss too many attacks due to the low recall (M). (4) AA-HMM is balanced and is the most accurate model, and would provide the highest security level to potential victims in real settings.

TABLE 5

Performance of deep neural network (DNN).

| DNN | Precision | Recall | Accuracy |
|---|---|---|---|
| Benign | 83.00% | 75.00% | 74.67% |
| Malicious | 65.80% | 74.20% | |

TABLE 6

Performance of soft-max regression (SMR).

| SMR | Precision | Recall | Accuracy |
|---|---|---|---|
| Benign | 96.56% | 63.73% | 78.06% |
| Malicious | 66.93% | 97.00% | |

TABLE 7

Performance of self-taught learning (STL).

| STL | Precision | Recall | Accuracy |
|---|---|---|---|
| Benign | 85.44% | 95.95% | 88.39% |
| Malicious | 93.62% | 78.41% | |

TABLE 8

Performance of AA-HMM

| AA-HMM | Precision | Recall | Accuracy |
|---|---|---|---|
| Benign | 93.37% | 95.31% | 93.48% |
| Malicious | 93.63% | 91.06% | |

Given the setting principle of efficiency matrix (see Equation (6)), the efficiency matrix for this experiment is defined in Table 9.

TABLE 9

Efficiency Matrix.

| Efficiency Matrix | Precision | Recall |
|---|---|---|
| Benign | 10 | 15 |
| Malicious | 100 | 150 |

As the calculated efficiencies result from Equations (7)-(10), AA-HMM also outperformed DNN, SMR, and STL in terms of efficiency (security/protection level provided to users in practice).

$$\text{Efficiency }(DNN)=0.8300\times10+0.7500\times15+0.6580\times100+0.7420\times150$$

$$=8.3+11.25+65.8+111.3=196.6500 \quad (7)$$

$$\text{Efficiency }(SMR)=0.9656\times10+0.6373\times15+0.6693\times100+0.9700\times150$$

$$=9.656+8.9373+66.93+145.5=231.0233 \quad (8)$$

$$\text{Efficiency }(STL)=0.8544\times10+0.9595\times15+0.9362\times100+0.7841\times150$$

$$=8.544+113925+93.6+117.615=234.1715 \quad (9)$$

$$\text{Efficiency }(AA\text{-}HMM)=0.9337\times10+0.9531\times15+0.9363\times100+0.9106\times150$$

$$=9.337+14.2965+93.63+136.59=253.8535 \quad (10)$$

Example 2

Figure 9:
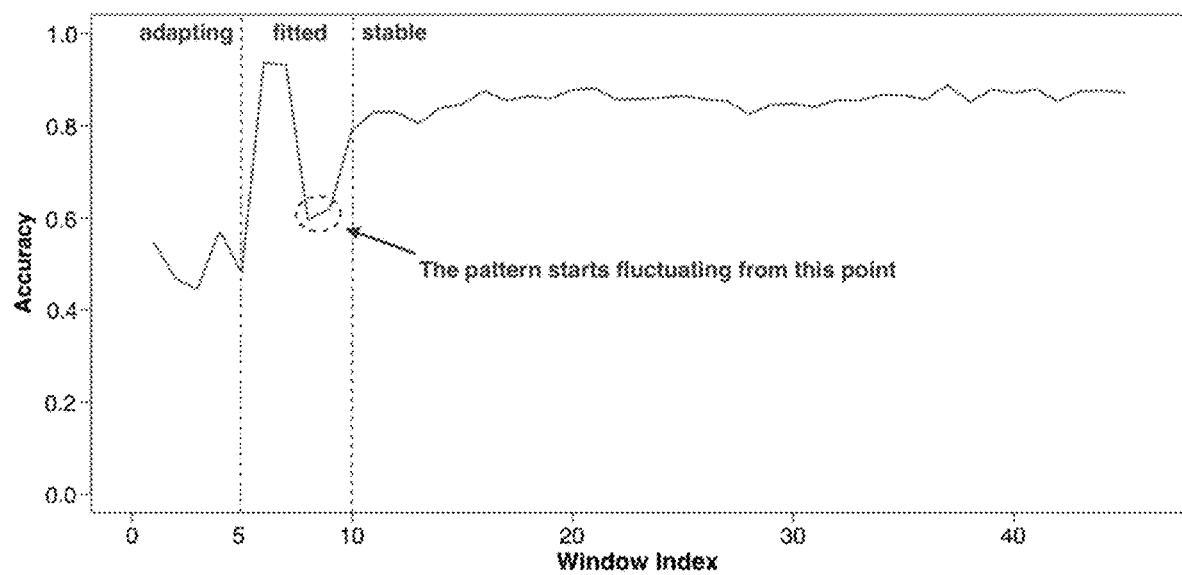
FIG. 9 is a plot of accuracy versus window index, showing a trajectory of the accuracy.

As a continuation of Example 1, after improving the performance, it was necessary to verify if the designed variables worked as expected and the performance improvement resulted from these variables. Taking one of the sub-models as an example (all the sub-models shared similar curves), its accuracy trajectory is shown FIG. 9. In the first five windows, the accuracies are very low because the model is adapting to the pattern from its initial state (BM). After fitting, the pattern starts to fluctuate, which lowers the accuracy again. However, the model rapidly fits the fluctuated pattern and maintains the accuracy at a high level until processing all the samples.

Figure 10:
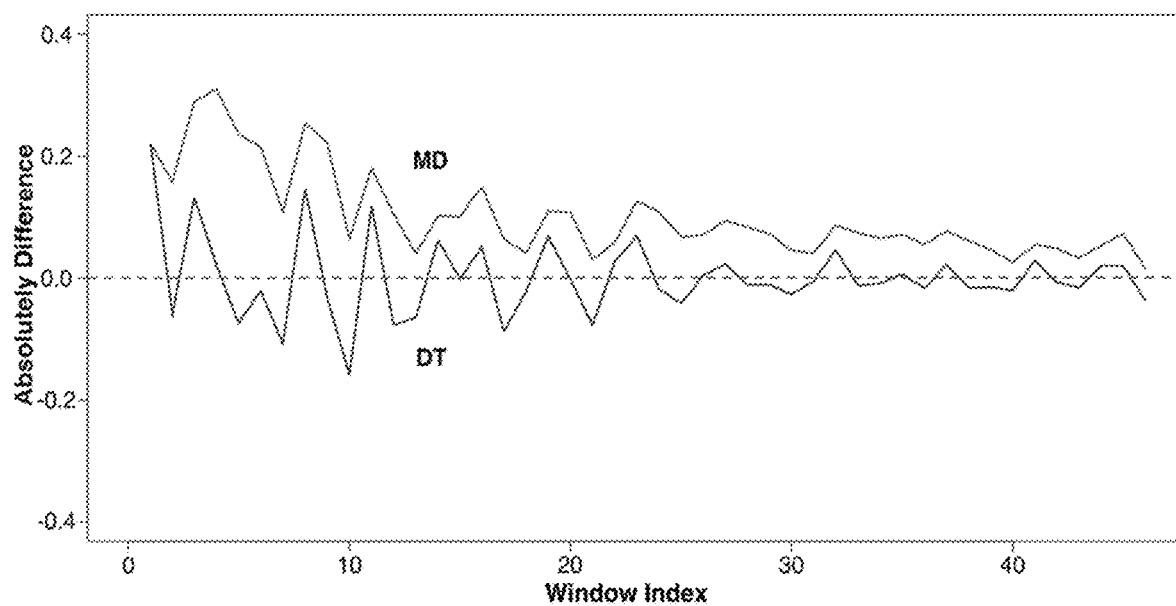
FIG. 10 is a plot of absolute difference versus window index, showing trajectories of MD and DT.

FIG. 10 shows the trajectories of MD and DT during evaluation; their values are very high in the early windows. Because the MD and DT act as the indicators of the variation and trend of the pattern in the current window, respectively, the two trajectories indicate that the accuracy would be low when the |MD| and |DT| are high and would be high when the |MD| and |DT| are low. This is consistent with the accuracy trajectory in FIG. 9: the accuracy increases as the |MD| and |DT| gradually approach zero, which indicates that the model successfully fitted the dynamic patterns and reached a local optimal state. Thus, MD and DT are sound metrics and effective adaptive mechanisms for AA-HMM.

Figure 11:
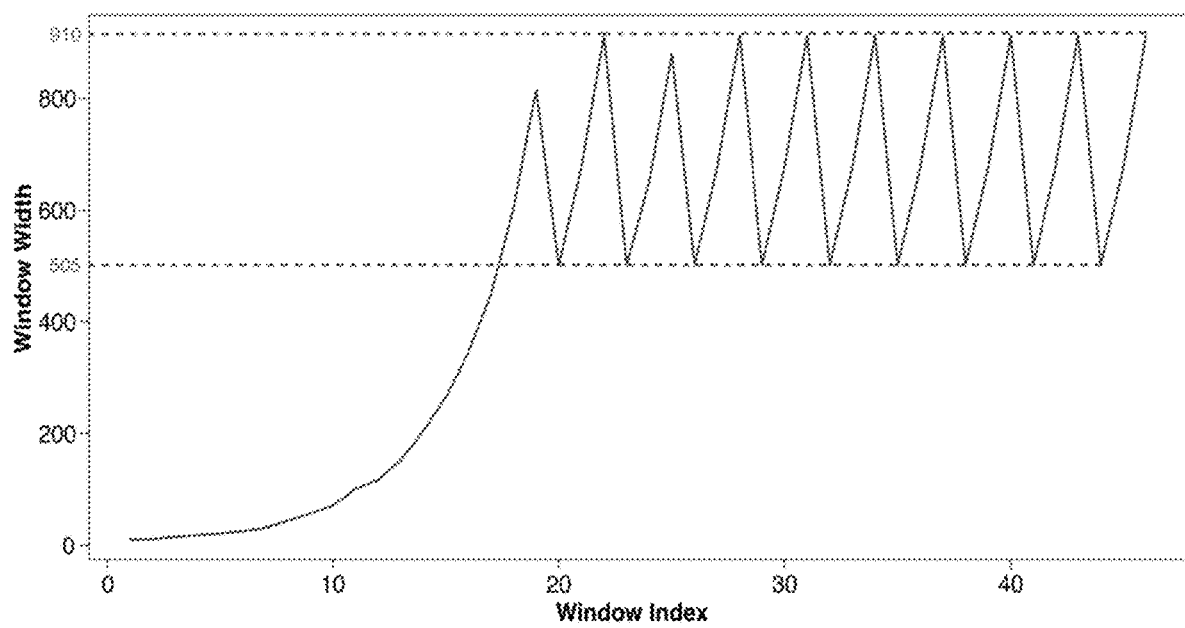
FIG. 11 is a plot of window width versus window index, showing a trajectory of dynamic window (DW).

FIG. 11 shows the trajectory of DW during evaluation, which gradually increased from the initial width of 10 and finally stabilized between 505 and 910. Referring to the accuracy trajectory in FIG. 9, the stage of DW stabilization overlapped the stable stage of the accuracy, which also indicates that the model successfully fitted the dynamic pattern and reached a local optimal state. In addition, the reason that the DW always reset to 505 is that TH indicates the pattern fluctuation is temporary and not strong, so it was not necessary to enlarge the DW to a value higher than the current upper bound of TH under this circumstance. The accuracy improved and stabilized with the aid of the TH. Thus, both the DW and TH are effective mechanisms for improving performance.

Because the model fit the pattern after the fifth window (FIG. 9), and referring to the DW trajectory (FIG. 11), the total number of samples in the first five windows (10, 11, 15, 18, and 21) was only 75. Compared with the total number of records (22,544) in the entire data set, the adaptive rate of AA-HMM was very high.

Example 3

The effectiveness of feedback mechanisms/variables of embodiments of the subject invention were tested on a new data set (patterns), CTU-13 (see Garcia et al., An empirical comparison of botnet detection methods. Comput. Secur. J. 2014, 45, 100-123; which is hereby incorporated by reference herein in its entirety). Specifically, in order to evaluate the AA-HMM's abilities to adapt and act as an anti-adversary on the current and intensively changed traffic patterns, the no. 10 data set of CTU-13 was employed. The no. 10 data set of CTU-13 is composed of violently fluctuating traffic patterns caused by an intensive distributed denial-of-service (DDoS) attack.

CTU-13 is a set of botnet traffic, which captures a large amount of real botnet traffic mixed with normal traffic and background traffic. The CTU-13 data set consists of 13 scenarios of different botnet samples. In each scenario, the creators execute a specific malware that uses several protocols and performs different actions. A detailed introduction can be found in Garcia et al. (supra.).

The User Datagram Protocol (UDP) DDoS data set (no. 10) of CTU-13 was used as the evaluation set, and the samples were labeled as benign or malicious. To test the AA-HMM's performance on intensive malicious attacks, a subset with an intensive pattern change (from no. 440,000 to no. 520,000-80,001 records in total) was extracted. The benign and malicious samples alternatively dominated the first and second half of the subset, respectively. This subset contains intensive DDoS attacks that are suddenly launched.

Figure 12:
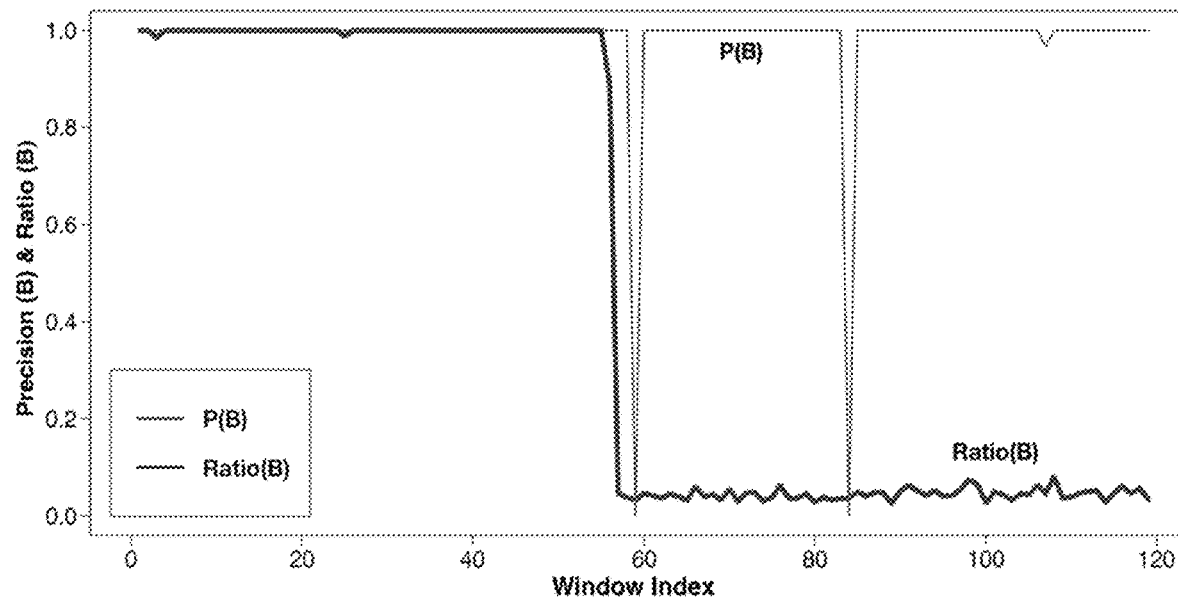
FIG. 12 is a plot of precision (B) and ratio (B) versus window index, showing the correlation between precision (B) and intensive attacks demonstrated in the drastically fluctuating pattern. B represents benign samples.

FIG. 12 is a plot of precision (benign (B)) and ratio (B) versus window index, showing the correlation between precision (B) and intensive attacks demonstrated in the drastically fluctuating pattern. Referring to FIG. 12, the thicker (blue) line represents the percentage of benign samples within each window. An intensive malicious attack (DDoS) occurs in this data set. However, the model maintained very high precision toward the benign samples (the thinner (red) line) when being attacked by an intensive DDoS attack.

Figure 13:
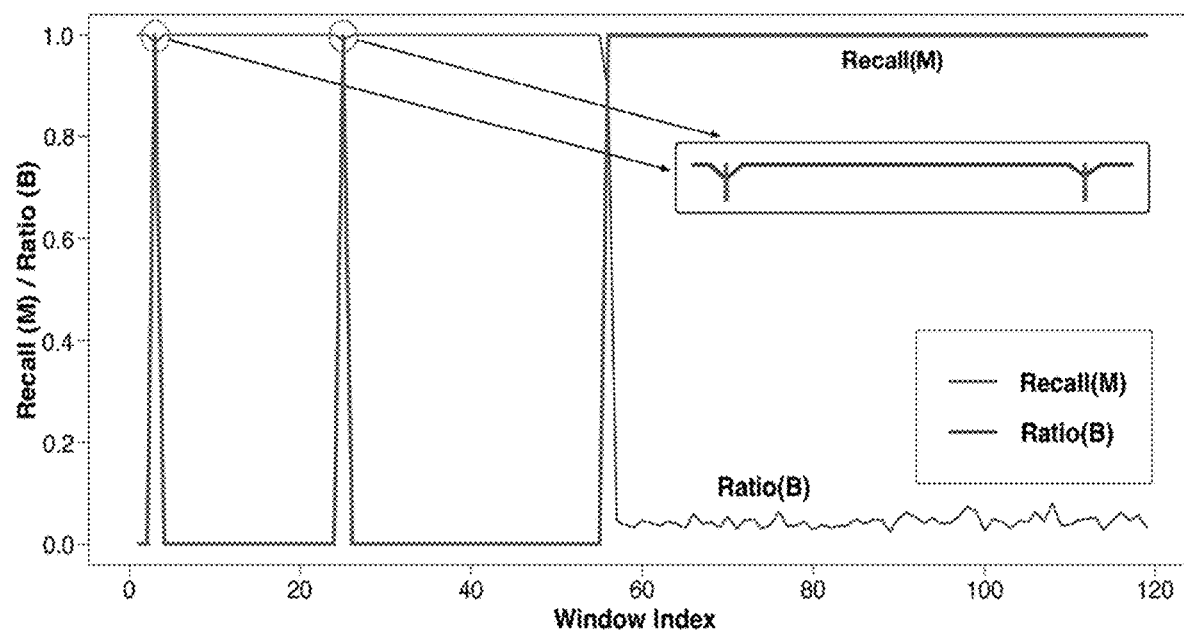
FIG. 13 is a plot of recall (M)/ratio (B) versus window index, showing the correlation between recall toward malicious samples and ratio of benign samples. M represents malicious samples.

FIG. 13 is a plot of recall (malicious (M))/ratio (B) versus window index, showing the correlation between recall toward malicious samples and ratio of benign samples. Referring to FIG. 13, the thinner (blue) line represents the percentage of malicious instances in each window and the thicker (red) line is the recall of malicious samples. Although the attacks occur only twice (the magnified two dents in the plot), in the first half of the data set, the recall of malicious samples within the two dents is 100%. AA-HMM is capable of identifying trivial malicious samples (one type of sample), which were overwhelmed by the benign samples (the other sample types). Thus, AA-HMM has a strong ability to resolve the imbalanced classes issue.

Figure 14:
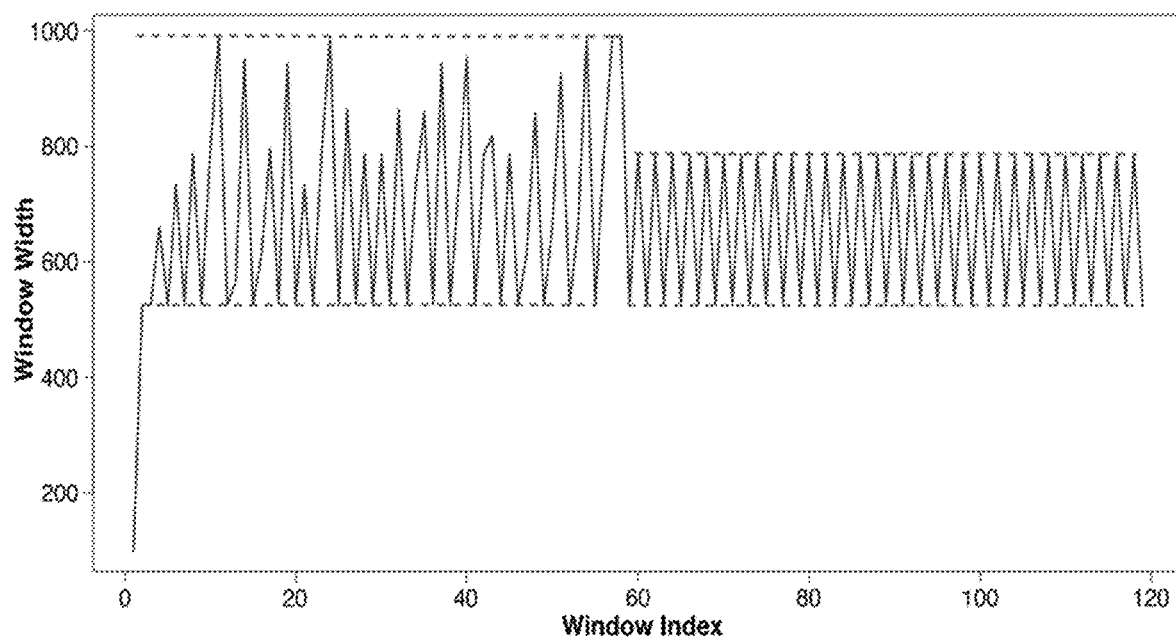
FIG. 14 is a plot of window width versus window index, showing a trajectory of DW.

Because different attacks have different patterns and result in varied WWs, the attacks can be visualized by the DW trajectory. Referring to FIG. 14, the first half of the DW trajectory is significantly different from the second half, which is compliant with the actual scenario (the DDoS attacks were launched and dominated the traffic after the middle point). Therefore, AA-HMM can be applied as a novel attack visualization tool to detect if the NIDS is being attacked or to even identify the attack types via the DW trajectory.

Figure 15:
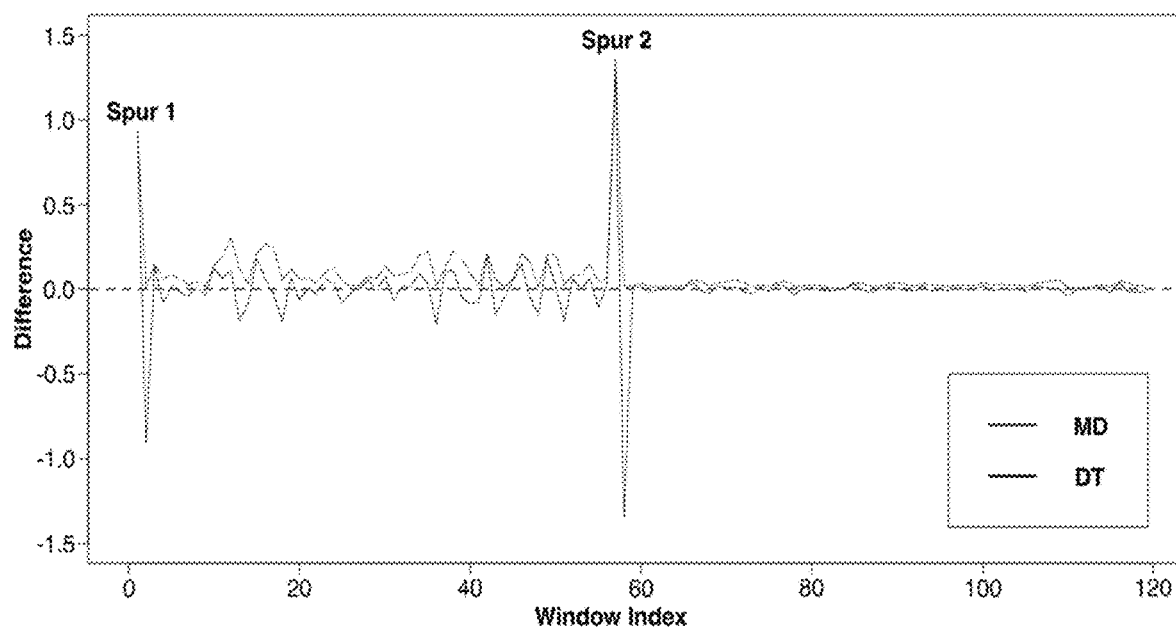
FIG. 15 is a plot of difference versus window index, showing trajectories of MD and DT. The (red) line that is slightly higher at window index of 40 is for MD; and the (blue) line that is slightly lower at window index of 40 is for DT.

From the perspective of attack distribution, there are two challenges in forming predications on this data set. As shown in FIG. 15: (1) spur 1 adapts the model to the first half of traffic from the BM; and (2) spur 2 adapts the model to the second half of the traffic (DDoS attacks) from the first half (normal traffic). Based on the trajectories of MD and DT, it can be concluded that both challenges and adaptation processes were resolved and completed rapidly because the MD and DT were reduced to a very low level within only three windows, which shows that the AA-HMM is responsive to intensive attacks.

Moreover, an AA-HMM model running in RStudio (RStudio, Redmond, United States) on a regular laptop can accomplish both the self-training and the evaluation processes on 10,000 samples within 2.5 seconds. When compared with the three deep-learning algorithms in Example 1, which usually require tens of seconds on the same amount of data, AA-HMM outperformed these algorithms in execution cost and accuracy, rendering the AA-HMM an extremely viable solution as a NIDS.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for network-based intrusion detection, the system comprising:
a processor;
a network device;
a display in operable communication with the processor;
a memory in operable communication with the processor; and
a machine-readable medium in operable communication with the processor, the memory, and the network device and comprising instructions stored thereon that, when executed by the processor, perform the following steps:
receiving a network dataset from the network device;
storing the network dataset on the memory;
utilizing a dynamic window (DW) of the network dataset to divide the network dataset into a plurality of sections by determining a local optimal window width (LOWW) for each section, respectively, of the plurality of sections and to set the window width (WW) of each section to its respective LOWW, the WW being a quantity of samples in a respective section;
utilizing a Hidden Markov Model-based process on the plurality of sections with the respective LOWWs to determine whether the network dataset is benign or malicious, thereby improving performance of the network device; and
displaying on the display a visualization of whether the network dataset is benign or malicious,
the DW utilizing a first pair of parameters to increase adaptability of the Hidden Markov Model-based process,
the first pair of parameters comprising a model difference (MD) and a difference trend (DT), and
the MD being a quantitative difference between adjacent sections of the plurality of sections and the DT being a difference between adjacent MDs.

2. The system according to claim 1, the Hidden Markov Model-based process using a Baum-Welch procedure for updating iterations of the Hidden Markov Model-based process.

3. The system according to claim 1, the utilizing of the DW to determine a LOWW for each section comprising minimizing a pattern variation of the plurality of sections.

4. The system according to claim 1, the DW utilizing a second pair of parameters to provide anti-adversarial capabilities to the Hidden Markov Model-based process.

5. The system according to claim 4,
the second pair of parameters comprising a threshold (TH) and a threshold controller (THC).

6. The system according to claim 5,
the TH being a range of the DW and the THC being a count of a quantity of times a bound of the TH is exceeded by the DW.

7. The system according to claim 5, the MD being calculated as follows:

$$MD(M_n, M_{n+1}) = \text{Diff}[M_n(W_n), M_{n+1}(W_{n+1})]$$

where $W_n$ is a section, $W_{n+1}$ is an adjacent section to $W_n$, $M_n$ represents a specific model on $W_n$, and $M_{n+1}$ represents a specific model on $W_{n+1}$ and
the DT being calculated as follows:

$$DT_n(MD_n, MD_{n+1}) = \text{Diff}(MD_n, MD_{n+1})$$
$$= \text{Diff}[MD_n(M_n, M_{n+1}),$$
$$MD_{n+1}(M_{n+1}, M_{n+2})]$$
$$= \text{Diff}\left\{ \begin{array}{l} \text{Diff}[M_n(W_n), M_{n+1}(W_{n+1})] \\ \text{Diff}[M_{n+1}(W_{n+1}), M_{n+2}(W_{n+2})] \end{array} \right\}.$$

8. The system according to claim 5, the MD and DT adjusting a current value of the WW based on the following operations:
a) when MD>E, based on a difference in magnitude between MD and E, the current value of the WW is decreased, then:
i) If DT>0, based on a difference in magnitude between the DT and 0, the current value of the WW is decreased again; and
ii) If DT<0, based on the difference in magnitude between the DT and 0, the current value of the WW is increased; and
b) when MD<E, based on the difference in magnitude between MD and E, the current value of the WW is increased, then:
i) If the DT>0, based on the difference in magnitude between DT and 0, the current value of the WW is increased again; and
ii) If DT<0, based on the difference in magnitude between the DT and 0, the current value of the WW is decreased, and
E being a first pre-defined value.

9. The system according to claim 8, the THC controlling the TH such that a current upper bound of the TH only being increased if F+THC requests for increasing TH are received, and
F being a second pre-defined value.

10. The system according to claim 5, the THC controlling the TH such that a current upper bound of the TH only being increased if F+THC requests for increasing TH are received, and
F being a second pre-defined value.

11. A method for network-based intrusion detection, the method comprising:
receiving, by a processor, a network dataset from a network device in operable communication with the processor;
storing the network dataset on a memory in operable communication with the processor;
utilizing, by the processor, a dynamic window (DW) of the network dataset to divide the network dataset into a plurality of sections by determining a local optimal window width (LOWW) for each section, respectively, of the plurality of sections and to set the window width (WW) of each section to its respective LOWW, the WW being a quantity of samples in a respective section;
utilizing, by the processor, a Hidden Markov Model-based process on the plurality of sections with the respective LOWWs to determine whether the network dataset is benign or malicious, thereby improving performance of the network device; and displaying, by the processor, a visualization of whether the network dataset is benign or malicious on a display in operable communication with the processor, the DW utilizing a first pair of parameters to increase adaptability of the Hidden Markov Model-based process, the first pair of parameters comprising a model difference (MD) and a difference trend (DT), and the MD being a quantitative difference between adjacent sections of the plurality of sections and the DT being a difference between adjacent MDs.

12. The method according to claim 11, the Hidden Markov Model-based process using a Baum-Welch procedure for updating iterations of the Hidden Markov Model-based process.

13. The method according to claim 11, the utilizing of the DW to determine a LOWW for each section comprising minimizing a pattern variation of the plurality of sections.

14. The method according to claim 11, the DW utilizing a second pair of parameters to provide anti-adversarial capabilities to the Hidden Markov Model-based process.

15. The method according to claim 14, the second pair of parameters comprising a threshold (TH) and a threshold controller (THC).

16. The method according to claim 15, the TH being a range of the DW and the THC being a count of a quantity of times a bound of the TH is exceeded by the DW.

17. The method according to claim 15, the MD being calculated as follows:

$$MD(M_n, M_{n+1}) = \text{Diff}[M_n(W_n), M_{n+1}(W_{n+1})]$$

where $W_n$ is a section, $W_{n+1}$ is an adjacent section to $W_n$, $M_n$ represents a specific model on $W_n$, and $M_{n+1}$ represents a specific model on $W_{n+1}$ and the DT being calculated as follows:

$$DT_n(MD_n, MD_{n+1}) = \text{Diff}(MD_n, MD_{n+1})$$
$$= \text{Diff}[MD_n(M_n, M_{n+1}),$$
$$MD_{n+1}(M_{n+1}, M_{n+2})]$$
$$= \text{Diff}\left\{ \begin{array}{l} \text{Diff}[M_n(W_n), M_{n+1}(W_{n+1})] \\ \text{Diff}[M_{n+1}(W_{n+1}), M_{n+2}(W_{n+2})] \end{array} \right\}.$$

18. The method according to claim 15, the MD and DT adjusting a current value of the WW based on the following operations:

a) when MD>E, based on a difference in magnitude between MD and E, the current value of the WW is decreased, then:

i) If DT>0, based on a difference in magnitude between the DT and 0, the current value of the WW is decreased again; and ii) If DT<0, based on the difference in magnitude between the DT and 0, the current value of the WW is increased; and b) when MD<E, based on the difference in magnitude between MD and E, the current value of the WW is increased, then:

i) If the DT>0, based on the difference in magnitude between DT and 0, the current value of the WW is increased again; and ii) If DT<0, based on the difference in magnitude between the DT and 0, the current value of the WW is decreased, and E being a first pre-defined value.

19. The method according to claim 18, the THC controlling the TH such that a current upper bound of the TH only being increased if F+THC requests for increasing TH are received, and F being a second pre-defined value.

20. A system for network-based intrusion detection, the system comprising:

a processor;

a network device;

a display in operable communication with the processor;

a memory in operable communication with the processor; and a machine-readable medium in operable communication with the processor, the memory, and the network device and comprising instructions stored thereon that, when executed by the processor, perform the following steps:

receiving a network dataset;

storing the network dataset on the memory;

utilizing a dynamic window (DW) of the network dataset to divide the network dataset into a plurality of sections by determining a local optimal window width (LOWW) for each section, respectively, of the plurality of sections and to set the window width (WW) of each section to its respective LOWW, the WW being a quantity of samples in a respective section;

utilizing a Hidden Markov Model-based process on the plurality of sections with the respective LOWWs to determine whether the network dataset is benign or malicious, thereby improving performance of the network device; and displaying on the display a visualization of whether the network dataset is benign or malicious, the Hidden Markov Model-based process using a Baum-Welch procedure for updating, the utilizing of the DW to determine a LOWW for each section comprising minimizing a pattern variation of the plurality of sections, the DW utilizing a first pair of parameters to increase adaptability of the Hidden Markov Model-based process and a second pair of parameters to provide anti-adversarial capabilities to the Hidden Markov Model-based process, the first pair of parameters comprising a model difference (MD) and a difference trend (DT), the second pair of parameters comprising a threshold (TH) and a threshold controller (THC), the MD being a quantitative difference between adjacent sections of the plurality of sections and the DT being a difference between adjacent MDs, the TH being a range of the DW and the THC being a count of a quantity of times a bound of the TH is exceeded by the DW, the MD being calculated as follows:

$$MD(M_n, M_{n+1}) = \text{Diff}[M_n(W_n), M_{n+1}(W_{n+1})]$$

where $W_n$ is a section, $W_{n+1}$ is an adjacent section to $W_n$, $M_n$ represents a specific model on $W_n$, and $M_{n+1}$ represents a specific model on $W_{n+1}$ and the DT being calculated as follows:

$$\begin{aligned}
DT_n(MD_n, MD_{n+1}) &= \text{Diff}(MD_n, MD_{n+1}) \\
&= \text{Diff}[MD_n(M_n, M_{n+1}), \\
&\quad MD_{n+1}(M_{n+1}, M_{n+2})] \\
&= \text{Diff}\left\{ \begin{array}{l} \text{Diff}[M_n(W_n), M_{n+1}(W_{n+1})] \\ \text{Diff}[M_{n+1}(W_{n+1}), M_{n+2}(W_{n+2})] \end{array} \right\},
\end{aligned}$$

the MD and DT adjusting a current value of the WW based on the following operations:
a) when MD>E, based on a difference in magnitude between MD and E, the current value of the WW is decreased, then:
  i) If DT>0, based on a difference in magnitude between the DT and 0, the current value of the WW is decreased again; and
  ii) If DT<0, based on the difference in magnitude between the DT and 0, the current value of the WW is increased; and
b) when MD<E, based on the difference in magnitude between MD and E, the current value of the WW is increased, then:
  i) If the DT>0, based on the difference in magnitude between DT and 0, the current value of the WW is increased again; and
  ii) If DT<0, based on the difference in magnitude between the DT and 0, the current value of the WW is decreased, the THC controlling the TH such that a current upper bound of the TH only being increased if F+THC requests for increasing TH are received, E being a first pre-defined value, and F being a second pre-defined value.

* * * * *